(12) United States Patent
Iso et al.

(10) Patent No.: US 10,498,962 B2
(45) Date of Patent: Dec. 3, 2019

(54) CAMERA MODULE THAT CORRECTS FOR CAMERA SHAKE AND OPTICAL-SYSTEM DISTORTION

(71) Applicant: Sony Corporation, Tokyo (JP)

(72) Inventors: Daisuke Iso, Tokyo (JP); Soichi Kuwahara, Kanagawa (JP); Hideshi Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/743,740

(22) PCT Filed: Jul. 8, 2016

(86) PCT No.: PCT/JP2016/070261
§ 371 (c)(1),
(2) Date: Jan. 11, 2018

(87) PCT Pub. No.: WO2017/014071
PCT Pub. Date: Jan. 26, 2017

(65) Prior Publication Data
US 2018/0213153 A1 Jul. 26, 2018

(30) Foreign Application Priority Data
Jul. 22, 2015 (JP) .................................. 2015-145335

(51) Int. Cl.
*H04N 5/232* (2006.01)
*G06T 5/00* (2006.01)
(Continued)

(52) U.S. Cl.
CPC .......... *H04N 5/23264* (2013.01); *G06T 5/006* (2013.01); *G06T 5/50* (2013.01);
(Continued)

(58) Field of Classification Search
CPC ........... H04N 5/23229; H04N 5/23251; H04N 5/23258; H04N 5/23264; H04N 5/23267;
(Continued)

(56) References Cited

U.S. PATENT DOCUMENTS

| | | | |
|---|---|---|---|
| 8,466,969 B2 * | 6/2013 | Goto | .................. H04N 5/23248 348/208.12 |
| 9,736,425 B2 | 8/2017 | Gu et al. | |

(Continued)

FOREIGN PATENT DOCUMENTS

| | | |
|---|---|---|
| JP | 2006-186884 A | 7/2006 |
| JP | 2011-160067 A | 8/2011 |

(Continued)

OTHER PUBLICATIONS

Written Opinion and English translation thereof dated Aug. 16, 2016 in connection with International Application No. PCT/JP2016/070261.

(Continued)

*Primary Examiner* — Ngoc Yen T Vu
(74) *Attorney, Agent, or Firm* — Wolf, Greenfield & Sacks, P.C.

(57) ABSTRACT

A camera module includes an image pickup portion, a motion detector, and a coordinate transformation processor. The motion detector detects a motion of the image pickup portion while an image of a subject is captured in the image pickup portion. The coordinate transformation processor executes coordinate transformation processing for collectively transforming coordinates of the image captured by the image pickup portion in such a way that effects on the image caused by camera shake of the image pickup portion, and by a distortion of an optical system used to obtain the image, are suppressed based on the motion of the image pickup portion detected by the motion detector, and based on a correction (Continued)

coefficient with which the distortion of the optical system is corrected. Technology used for the camera module may be applied to a CMOS image sensor.

12 Claims, 25 Drawing Sheets

(51) Int. Cl.
*H04N 5/357* (2011.01)
*H04N 5/374* (2011.01)
*H04N 5/378* (2011.01)
*G06T 5/50* (2006.01)

(52) U.S. Cl.
CPC ..... *H04N 5/23229* (2013.01); *H04N 5/23251* (2013.01); *H04N 5/23258* (2013.01); *H04N 5/23267* (2013.01); *H04N 5/3572* (2013.01); *H04N 5/374* (2013.01); *H04N 5/378* (2013.01); *G03B 2217/005* (2013.01); *G06T 2207/10016* (2013.01)

(58) Field of Classification Search
CPC ...... H04N 5/3572; H04N 5/378; H04N 5/374; G06T 5/00; G06T 5/006
See application file for complete search history.

(56) References Cited

U.S. PATENT DOCUMENTS

| | | | |
|---|---|---|---|
| 9,813,626 B2 * | 11/2017 | Ohki | H04N 5/23254 |
| 9,979,945 B2 | 5/2018 | Hitomi et al. | |
| 10,070,067 B2 | 9/2018 | Jo et al. | |
| 2006/0140503 A1 | 6/2006 | Kurata et al. | |
| 2012/0113278 A1 | 5/2012 | Okada | |
| 2013/0050177 A1 | 2/2013 | Sato | |
| 2013/0050284 A1 | 2/2013 | Sato | |
| 2015/0341576 A1 | 11/2015 | Gu et al. | |
| 2017/0034412 A1 | 2/2017 | Jo et al. | |
| 2017/0134706 A1 | 5/2017 | Hitomi et al. | |

FOREIGN PATENT DOCUMENTS

| | | |
|---|---|---|
| JP | 2012-103741 A | 5/2012 |
| JP | 2014-064327 A | 4/2014 |
| JP | 2014-203400 A | 10/2014 |
| WO | WO 2014/156731 A1 | 10/2014 |

OTHER PUBLICATIONS

International Preliminary Report on Patentability and English translation thereof dated Feb. 1, 2018 in connection with International Application No. PCT/JP2016/070261.
International Search Report and English translation thereof dated Aug. 16, 2016 in connection with International Application No. PCT/JP2016/070261.
Zhang Z., Flexible Camera Calibration by Viewing a Plane From Unknown Orientations, IEEE, 1999, Microsoft Research, Redmond, WA, 8 pages.
U.S. Appl. No. 13/556,628, filed Jul. 24, 2012, Sato.
U.S. Appl. No. 13/560,773, filed Jul. 27, 2012, Sato.
U.S. Appl. No. 14/816,976, filed Aug. 3, 2015, Gu et al.
U.S. Appl. No. 15/302,670, filed Oct. 7, 2016, Jo et al.
U.S. Appl. No. 15/405,962, filed Jan. 13, 2017, Hitomi et al.

* cited by examiner

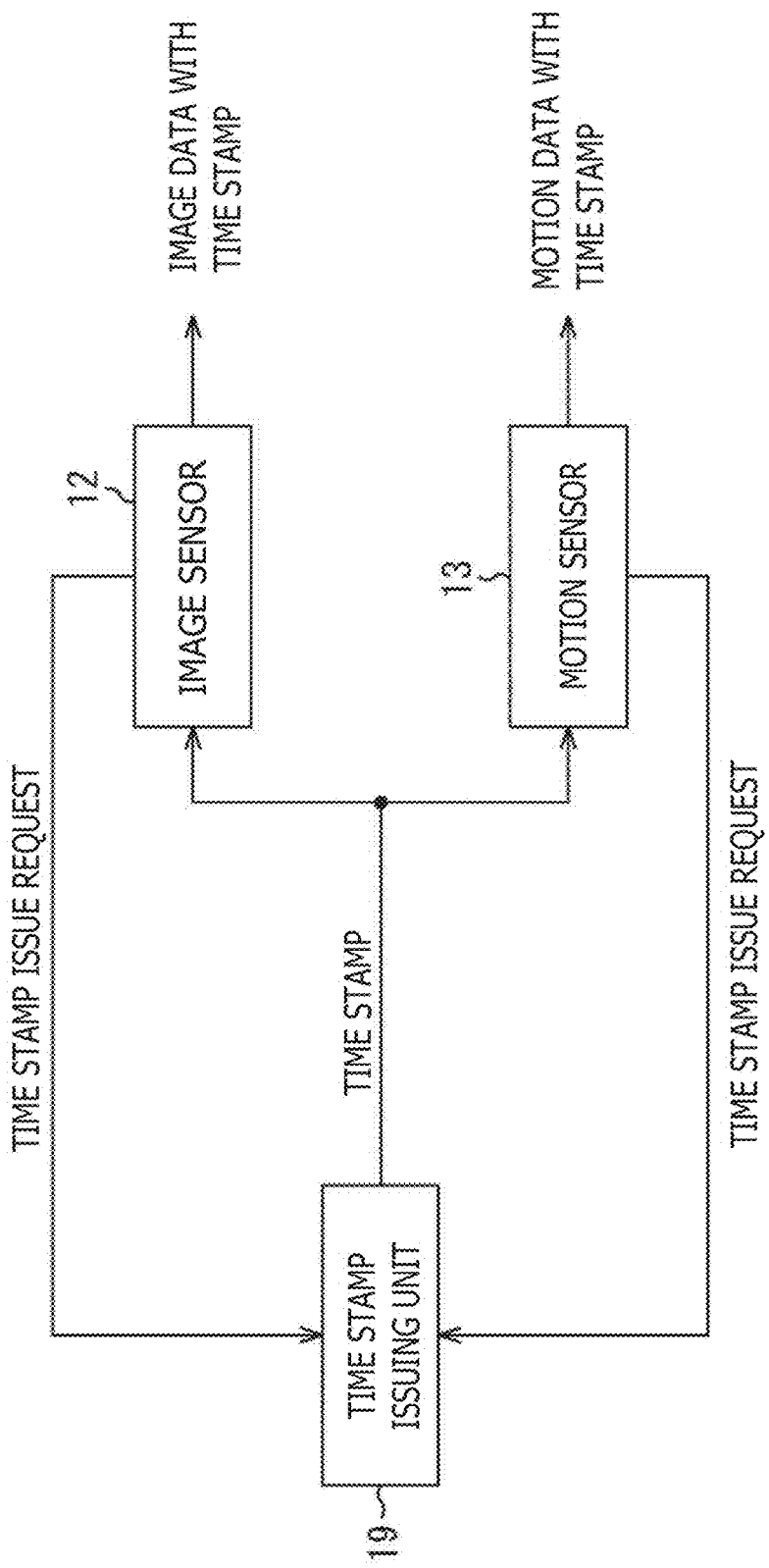
F I G. 5

FIG. 8
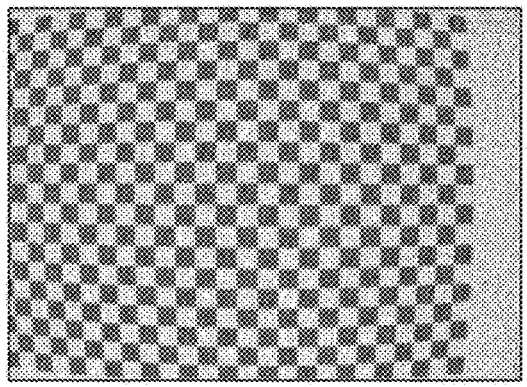
INPUT IMAGE (DISTORTION, CAMERA SHAKE)
 DISTORTION CORRECTION
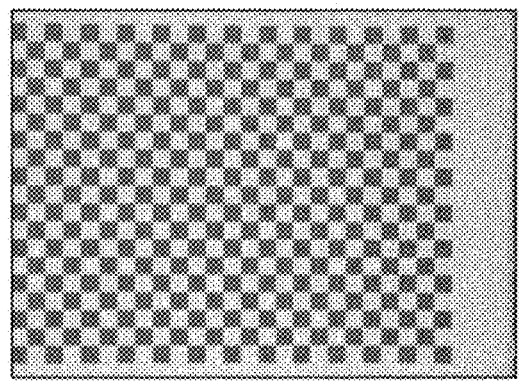
DISTORTION-CORRECTED IMAGE (CAMERA SHAKE)
 IMAGE STABILIZATION
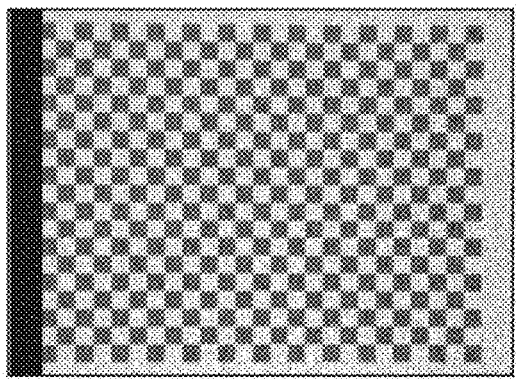
CORRECTED IMAGE FIG.14
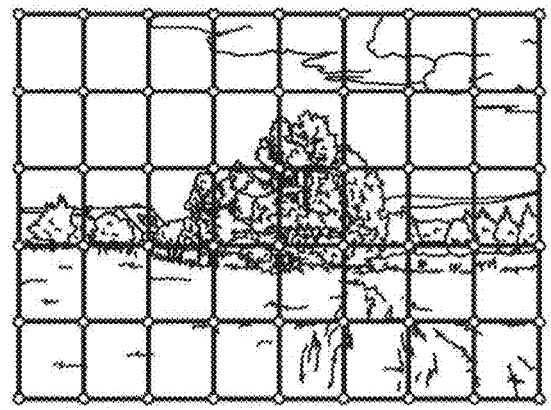
A
CONTROL PIXELS ARE UNIFORMLY ARRANGED
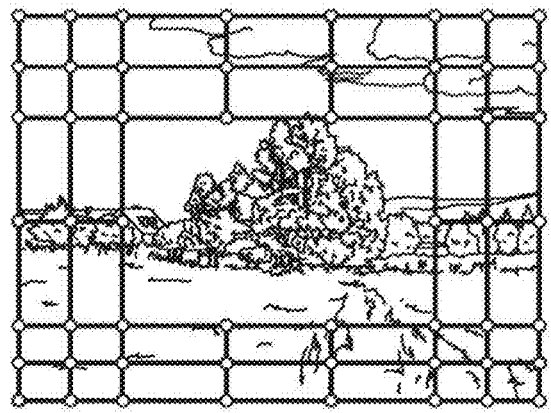
B
CONTROL PIXELS ARE NON-UNIFORMLY ARRANGED

CAMERA MODULE THAT CORRECTS FOR CAMERA SHAKE AND OPTICAL-SYSTEM DISTORTION

CROSS-REFERENCE TO RELATED APPLICATIONS

This application is a U.S. National Stage Entry under 35 U.S.C. § 371 of International Application No. PCT/JP2016/070261, filed in the Japanese Patent Office on Jul. 8, 2016, which claims priority to Japanese Patent Application Number JP2015-145335, filed in the Japanese Patent Office on Jul. 22, 2015, each of which is incorporated by reference herein in its entirety.

TECHNICAL FIELD

The present disclosure relates to a camera module, a solid-state image pickup element, an electronic apparatus, and an image pickup method, and more particularly to a camera module, a solid-state image pickup element, an electronic apparatus, and an image pickup method each of which is capable of effectively correcting camera shake and a lens distortion.

BACKGROUND ART

Hereinafter, an image pickup element has been able to suppress an influence which camera shake of an image pickup device exerts on an image by utilizing Optical Image Stabilizer (OIS) or Electronic Image Stabilization (EIS).

For example, in the past electronic image stabilization, image processing was executed so as to correct the camera shake by a method of obtaining a motion amount from an image. In this method, however, the calculation processing was complicated, the measurement accuracy of the motion amount under low illuminance was reduced, and an estimation error of the camera shake amount due to a moving subject occurred. Therefore, the accuracy of the image stabilization was reduced in some cases.

In contrast, the electronic image stabilization using motion sensor information detected by a gyro-sensor, an acceleration sensor or the like has been proposed. However, in the past electronic image stabilization using the motion sensor information, a position of the whole image has been only moved in conjunction with the motion amount. Thus, it has been difficult to cope with a difference in motion amount due to the position within an image surface. In particular, in the case where an image pickup element using a rolling shutter like a Complementary Metal Oxide Semiconductor (CMOS) image sensor has been used, the measures have not been taken for a difference (focal plane phenomenon) in movement amount within one picture due to the shift in exposure time for each line of pixels.

Then, the present applicant, as disclosed in PTL 1, has proposed an image pickup device which can carry out the image stabilization in response to the difference in movement amount due to the position within the image surface, or the difference in movement amount motion due to the shift of the exposure time within one picture. By adopting the image stabilization, the camera shake can be corrected with high accuracy from the center to the periphery. In addition thereto, the deformation due to the focal plane phenomenon can also be suppressed.

In addition, in general, with respect to the lens distortion correcting processing, the various methods have been proposed. For example, a method of Zhang for imaging a checkerboard by utilizing the lens the parameters of which are desired to be measured is frequently utilized.

CITATION LIST

Patent Literature

[PTL 1]
Pamphlet of WO2014/156731
[NPL 1]
"Flexible Camera Calibration by Viewing a Plane from Unknown Orientations," Zhengyou Zhang, ICCV99

SUMMARY

Technical Problem

Incidentally, as described above, the satisfactory effect can be obtained by the image stabilization disclosed in PTL 1. However, it is desired to more effectively correct the camera shake and the lens distortion.

The present disclosure has been made in the light of such circumstances, and aims at enabling camera shake and a lens distortion to be effectively corrected.

Solution to Problem

A camera module according to an aspect of the present disclosure is provided with an image pickup portion, a motion detecting portion, and a coordinate transformation processing portion. In this case, the image pickup portion receives light, from a subject, made incident thereto through an optical system, thereby imaging the subject. The motion detecting portion detects a motion of the image pickup portion while the image for at least one frame is captured in the image pickup portion. The coordinate transformation processing portion executes coordinate transformation processing for collectively transforming the coordinates on the image captured by the image pickup portion in such a way that an influence which both camera shake of the image pickup portion, and a distortion of the optical system exert on the image is suppressed based on the motion of the image pickup portion detected by the motion detecting portion, and a correction coefficient with which the distortion of the optical system is corrected.

A solid-state image pickup element according to an aspect of the present disclosure is provided with an image pickup portion, and a coordinate transformation processing portion. In this case, the image pickup portion receives light, from a subject, made incident thereto through an optical system, thereby imaging the subject. The coordinate transformation processing portion executes coordinate transformation processing for collectively transforming coordinates on the image captured by the image pickup portion in such a way that an influence which both camera shake of the image pickup portion, and a distortion of the optical system exert on the image is suppressed based on a motion of the image pickup portion detected by a motion detecting portion configured to detect the motion of the image pickup portion while the image for at least one frame is captured in the image pickup portion, and a correction coefficient with which the distortion of the optical system is corrected.

An electronic apparatus according to an aspect of the present disclosure is provided with an image pickup portion, a motion detecting portion, and a coordinate transformation processing portion. In this case, the image pickup portion receives light, from a subject, made incident thereto through an optical system, thereby imaging the subject. The motion detecting portion detects a motion of the image pickup portion while the image for at least one frame is captured in the image pickup portion. The coordinate transformation processing portion executes coordinate transformation processing for collectively transforming the coordinates on the image captured by the image pickup portion in such a way that an influence which both camera shake of the image pickup portion, and a distortion of the optical system exert on the image is suppressed based on the motion of the image pickup portion detected by the motion detecting portion, and a correction coefficient with which the distortion of the optical system is corrected.

An image pickup method according to an aspect of the present disclosure includes imaging a subject by an image pickup portion configured to receive light, from the subject, made incident thereto through an optical system, and detecting a motion of the image pickup portion while the image for at least one frame is captured in the image pickup portion. In addition, the image pickup method includes executing coordinate transformation processing for collectively transforming the coordinates on the image captured by the image pickup portion at once in such a way that an influence which both camera shake of the image pickup portion, and a distortion of the optical system exert on the image is suppressed based on the detected motion of the image pickup portion, and a correction coefficient with which the distortion of the optical system is corrected.

In an aspect of the present disclosure, the subject is imaged by the image pickup portion which receives the light, from the subject, made incident thereto through the optical system. The motion of the image pickup portion while the image for at least one frame is captured in the image pickup portion is detected. In addition, there is executed the coordinate transformation processing for collectively transforming the coordinates on the image captured by the image pickup portion at once in such a way that an influence which both camera shake of the image pickup portion, and the distortion of the optical system exert on the image is suppressed based on the detected motion of the image pickup portion, and a correction coefficient with which the distortion of the optical system is corrected.

Advantageous Effect of Invention

According to an aspect of the present disclosure, the camera shake and the lens distortion can be effectively corrected.

BRIEF DESCRIPTION OF DRAWINGS

FIG. 5 is a block diagram explaining a fourth synchronization system.
FIG. 8 is a view explaining general lens distortion correcting processing and image stabilization processing.
FIG. 14 is a view depicting an example of arrangement in which the control pixels are uniformly or non-uniformly arranged in the image.

DESCRIPTION OF EMBODIMENTS

Hereinafter, concrete embodiments to each of which the present technique is applied will be described in detail with reference to the drawings.

Example of Configuration of Camera Module

Figure 1:
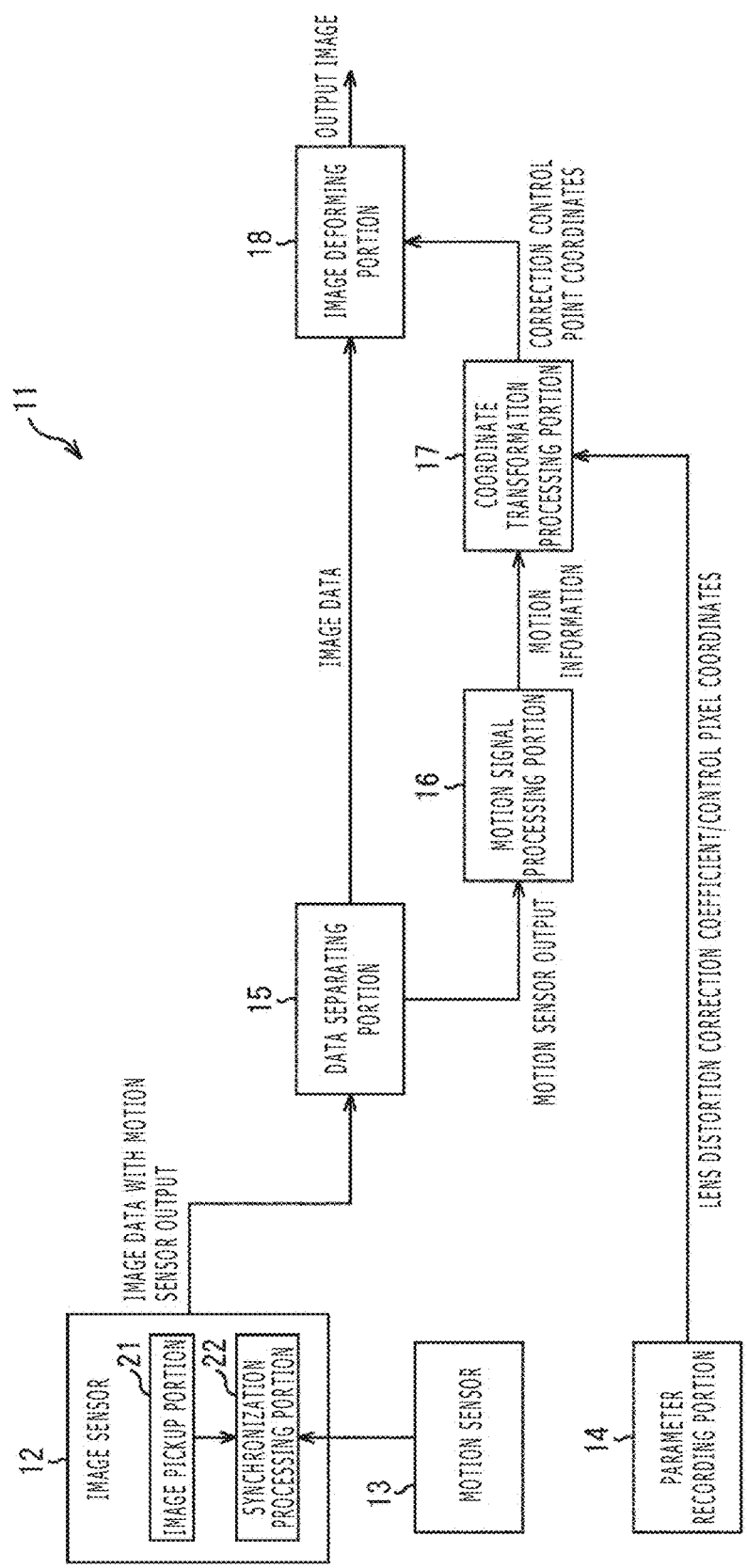
FIG. 1 is a block diagram depicting an example of a configuration of an embodiment of a camera module to which the present technique is applied.

FIG. 1 is a block diagram depicting an example of a configuration of an embodiment of a camera module to which the present technique is applied.

As depicted in FIG. 1, a camera module 11 is configured to be provided with an image sensor 12, a motion sensor 13, a parameter storing portion 14, a data separating portion 15, a motion signal processing portion 16, a coordinate transformation processing portion 17, and an image deforming portion 18.

The image sensor 12 has an image pickup portion 21 and a synchronization processing portion 22, and an interface for the motion sensor 13 is mounted to the image sensor 12. The image sensor 12 fetches in a motion sensor output outputted thereto from the motion sensor 13 via the interface. Then, the image sensor 12 outputs image data with the motion sensor output in which the motion sensor output is added to the image data outputted from the image pickup portion 21.

The image pickup portion 21 captures an image, of a subject, which is obtained in such a way that light from the subject is condensed by an optical system (not depicted) to be imaged on an image pickup surface on which a plurality of pixels is arranged in a matrix. The image pickup portion 21 outputs image data acquired from the captured image.

The synchronization processing portion 22 executes synchronization processing for synchronizing the image data outputted thereto from the image pickup portion 21, and the motion sensor output outputted thereto from the motion sensor 13 with each other, and integrating the image data and the motion sensor output with each other to output the resulting data. It should be noted that details of the synchronization processing by the synchronization processing portion 22 will be described later with reference to FIG. 2 to FIG. 6.

The motion sensor 13, for example, is constituted by a gyro-sensor which can detect angular velocities in 3-axis directions, and outputs a motion of the camera module 11 represented by these angular velocities as a motion sensor output. It should be noted that a sensor which can detect motions in a 6-axis or 9-axis directions (an angular acceleration, an acceleration or the like) may also be used as the motion sensor 13.

Figure 13:
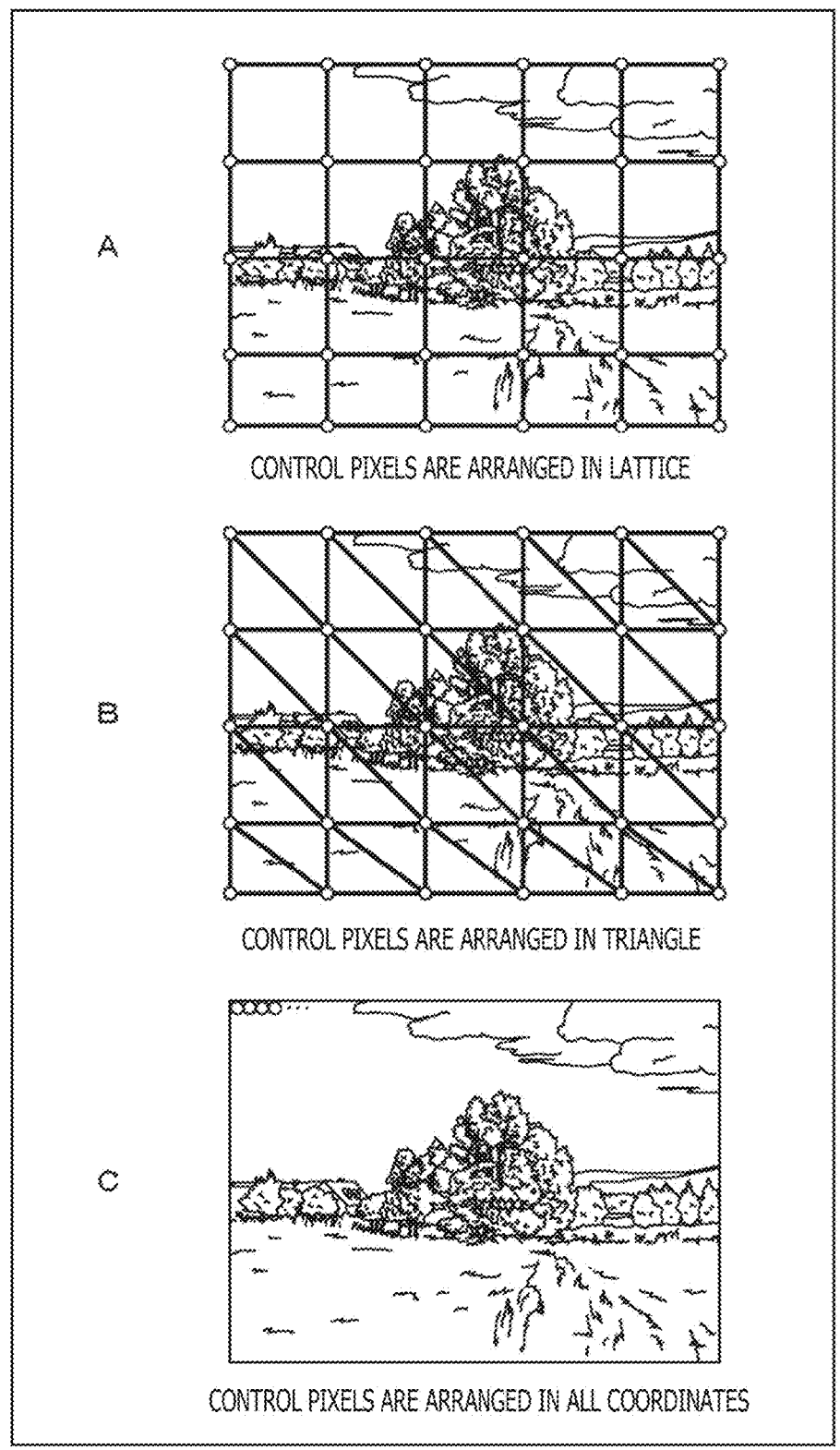
FIG. 13 is a view depicting an example of arrangement in which control pixels are arranged in an image.

The parameter storing portion 14 stores various kinds of parameters which the coordinate transformation processing portion 17 uses when it executes the coordinate transformation processing, for example, a lens distortion correction coefficient, control pixel coordinates, and the like. The lens distortion correction coefficient is a coefficient which is obtained in advance so as to correct the lens distortion previously measured which the optical system has with the coordinates of the pixels constituting the image pickup portion 21 of the image sensor 12 as parameters. The control pixel coordinates, as depicted in FIG. 13 and FIG. 14, are the coordinates specifying a specific control pixel(s) becoming an object when the pixel conversion is accurately carried out.

The data separating portion 15 separates the image data with the motion sensor output supplied thereto from the image sensor 12 into the image data and the motion sensor output. Then, the data separating portion 15 supplies the motion sensor output to the motion signal processing portion 16, and supplies the image data to the image deforming portion 18.

The motion signal processing portion 16 executes signal processing for transforming the motion sensor output supplied thereto from the data separating portion 15 into the motion information representing the motion of the camera module 11 and supplies the motion information on the camera module 11 to the coordinate transformation processing portion 17. For example, the motion signal processing portion 16, when the angular velocities in the 3-axis directions are supplied thereto as the motion sensor output, can transforming the angular velocities into angles of rotation in the 3-axis directions change amounts of angles by integrating these angular velocities. At this time, the motion signal processing portion 16 can correct an integration error or the like which is generated when the conversion is carried out.

The coordinate transformation processing portion 17 executes coordinate transformation processing for transforming the coordinates of the image in such a way that an influence which both the camera shake of the image sensor 12, and the lens distortion of the optical system exert on the image captured by the image sensor 12 is suppressed every control pixel coordinate (refer to FIG. 13 and FIG. 14 which will be described later) read out from the parameter storing portion 14. At this time, the coordinate transformation processing portion 17 executes the coordinate transformation processing in such a way that the image stabilization based on the motion information of the camera module 11 supplied thereto from the motion signal processing portion 16, and the lens distortion correction based on the lens distortion correction coefficient read out from the parameter storing portion 14 are carried out at once. Then, the coordinate transformation processing portion 17 supplies the correction control point coordinates obtained every control pixel coordinate through the coordinate transformation processing to the image deforming portion 18. It should be noted that the details of the coordinate transformation processing by the coordinate transformation processing portion 17 will be described later with reference to FIG. 8 to FIG. 11.

The image deforming portion 18 executes image deforming processing for the image data supplied thereto from the data separating portion 15 in accordance with the correction control point coordinates supplied thereto from the coordinate transformation processing portion 17. For example, the image deforming portion 18 deforms the image by using a pixel value of the control point coordinates in the image data before the correction as a pixel value of the correction control point coordinate corresponding to the control point coordinates concerned. In addition, the image deforming portion 18 executes interpolation processing for interpolating the pixels having the coordinates other than the control point coordinates by utilizing a result of the image deformation processing for the pixels of the control point coordinates. Then, the image deforming portion 18 outputs a correction result image in which the camera shake and lens distortion obtained as a result of executing the image deformation processing are corrected as an output image to a block in a subsequent stage (not depicted).

The camera module 11 is configured in the manner as described above, and the image data with the motion sensor output into which the motion sensor output outputted thereto from the motion sensor 13 is synchronously integrated with the image data is outputted from the image sensor 12. Then, such coordinate transformation processing as to correct the camera shake and the lens distortion at once is executed in the coordinate transformation processing portion 17. The image deformation processing based on the correction control point coordinates is executed in the image deforming portion 18. As a result, the camera module 11 can effectively correct the camera shake and the lens distortion.

<With Respect to Synchronization Processing>

With respect to a mechanism in which the synchronization processing portion 22 synchronizes the image data and the motion sensor output with each other, first to fifth synchronization systems will now be described with reference to FIG. 2 to FIG. 6.

Figure 2:
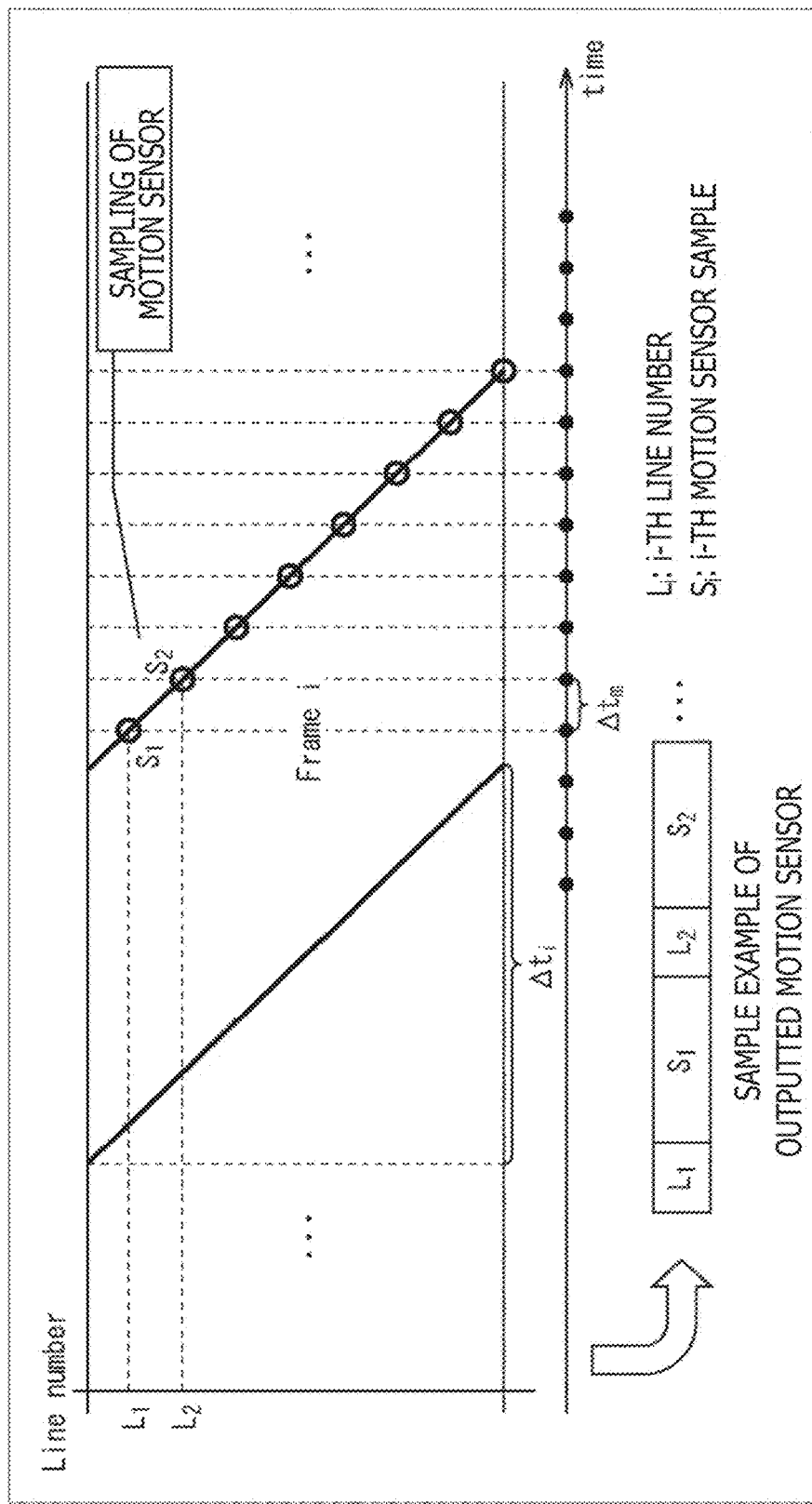
FIG. 2 is a view explaining a first synchronization system.

Firstly, a mechanism for recording line numbers in a pixel matrix of the image pickup portion 21 when a sample is outputted from the motion sensor 13 is described as the first synchronization system with reference to FIG. 2.

For example, when the imaging is carried out in accordance with a rolling shutter system by the CMOS image sensor, as depicted in FIG. 2, the samples are successively outputted in accordance with a line number of the image pickup portion 21. In FIG. 2, a line number $L_i$ represents an i-th line number of the pixels which are arranged in a matrix in the image pickup portion 21. A motion sensor sample Si represents the i-th output (motion sensor output) outputted after the imaging of the frame is started.

For example, when the samples are read out in accordance with the rolling shutter system, a read time $\Delta t_r$ dependent on a frame rate is required for the reading from the head line to the final line of the image. Specifically, when the image sensor 12 operates for 60 Frame Per Second (60 FPS), the read time $\Delta t_i$ is approximately 16.7 milliseconds (=1,000 milliseconds/60 frame).

On the other hand, since while the image sensor 12 is driven, the motion sensor 13 also operates, the samples of the motion sensor 13 can be acquired in correspondence to the sampling rate $\Delta t_m$ of the motion sensor 13. For example, when the sampling rate of the motion sensor 13 is 1 kHz, one motion sensor sample can be acquired every 1 millisecond.

In such a way, the image pickup portion 21 and the motion sensor 13 operate at the independent sampling rates. In addition, with regard to the image, the control (horizontal synchronization) can be carried out on a line-by-line basis as a finer unit than the frame unit. Therefore, if the sample of the motion sensor is acquired at a timing at which a certain line has been read out, then, that line number and the motion sensor sample can be made to correspond to each other.

In the camera module 11, by utilizing this, the synchronization processing portion 22 executes such synchronization processing as to link all the acquired samples of the motion sensor, and the line number at the timing at which the sample concerned can be acquired to each other in a certain frame. In such a way, the camera module 11 can carry out the synchronization of the positions of the motion sensor samples within the frame.

In an example depicted in FIG. 2, the first motion sensor sample $S_1$ in the frame i is acquired at the timing at which the line number $L_1$ has been read out. The synchronization processing portion 22 records the motion sensor sample $S_1$ and the line number $L_1$ so as to be linked to each other. Likewise, the synchronization processing portion 22 records the motion sensor sample $S_2$ and the line number $L_2$ so as to be linked to each other, and records the motion sensor sample and the line number in and after that time so as to be linked to each other. Then, the synchronization processing portion 22, at the timing at which the recording for one frame has been ended, outputs all the motion sensor samples acquired during the reading for one frame together with the image data from the image sensor 12. As stated above, the synchronization processing portion 22 can synchronize the image data and the motion sensor output with each other.

Incidentally, when the motion sensor samples are actually used, it is necessary to take a time delay outputted from the motion sensor 13, an exposure time of the image sensor 12, the position within the frame of the image data, and the like into consideration. That is to say, some motion sensors 13 adopt a low-pass filter in the inside of the sensor, and adoption of the low-pass filter causes the delay. For this reason, the synchronization processing portion 22 needs to link the motion sensor sample shifted by the time delay to the line number.

In addition, the timing at which the correction should be carried out differs depending on the exposure time of the image sensor 12. For example, in the electronic image stabilization, it is suitable to use the motion sensor output which can be acquired at the timing of the middle of the exposure time. Therefore, when the timing of the horizontal synchronization is the timing of the reading end of the line concerned, it is preferable to shift the timing. That is to say, if the exposure time is 16 milliseconds, then, it is preferable to carry out the correction by using the motion sensor output at the timing before 8 milliseconds.

Of course, the timing can be shifted depending on the processing. In addition, a value obtained by averaging the motion sensor outputs for the entire time within the exposure time of a certain line may be used for the correction of the line concerned. It should be noted that the line number is specified every sampling, so that the number of lines corresponding to the sampling period of the motion sensor output can be readily calculated. From this relationship, the delay amount is re-converted into the number of lines, and thus the shift of the timing is shifted within the image by the number of lines depending on the delay amount, in a word, shifted in the y-coordinate direction, thereby enabling the adjustment to be readily carried out.

In addition, in the CMOS image sensor, in a period of time ranging from the timing at which the vertical synchronization is outputted to the timing at which the true image is read out, a time required for judgment processing for optical black (OPB), a timing required for other pieces of processing, and the like are contained in some cases. In such cases, a difference is generated between the line number described above and the true image. Thus, for causing the line number and the true image to agree with each other, and this difference needs to be taken into consideration. In a word, the delay amount caused by this difference is calculated with the number of lines as a unit, and the number of lines is shifted depending on the delay amount, thereby enabling the line number and the true image to agree with each other.

As described above, the synchronization processing portion 22 links the sample of the motion sensor 13 and the line number of the pixel matrix of the image pickup portion 21 to each other with the timing at which the sample is outputted from the motion sensor 13 as the reference by the first synchronization system, thereby enabling the image data and the motion sensor output to be synchronized with each other.

Next, a mechanism for allocating the sample numbers of the samples outputted thereto from the motion sensor 13 to the line numbers of the pixel matrix in the image pickup portion 21 will be described as the second synchronization system with reference to FIG. 3.

For example, the second synchronization system is such that the relationship between the image sensor 12 and the motion sensor 13 in the first synchronization system depicted in FIG. 2 is reversed. Firstly, similarly to the first synchronization system, the samples of the motion sensor 13 can be acquired at the time interval decided in accordance with the sampling rate $\Delta t_m$.

Figure 3:
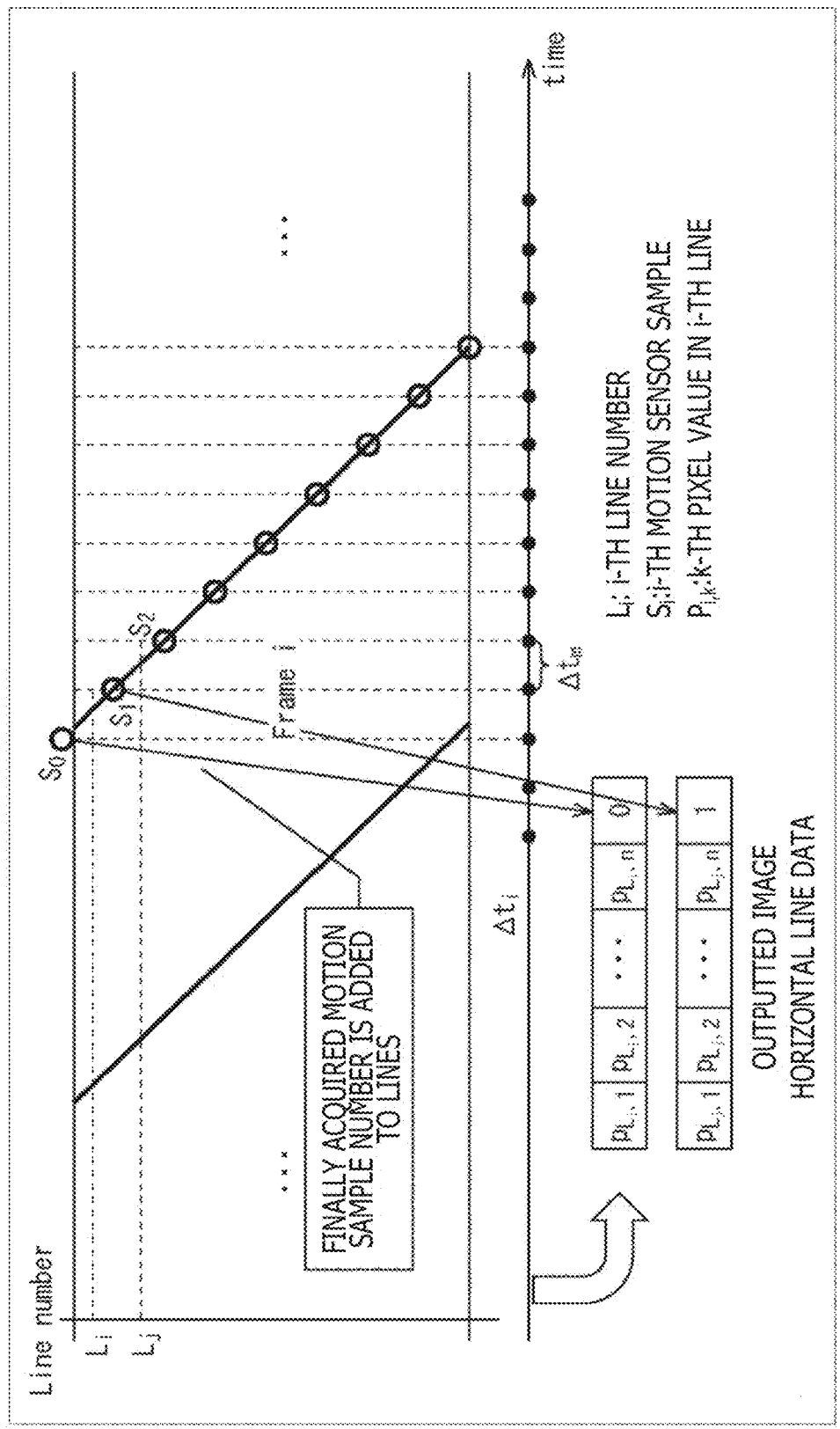
FIG. 3 is a view explaining a second synchronization system.

A motion sensor sample $S_0$ depicted in FIG. 3 is a sample which is acquired during the exposure of the previous frame. In a word, the motion sensor sample $S_0$ is the last sample which was acquired before the timing at which the line number $L_i$ is read out. At this time, the synchronization processing portion 22 links a number 0 with which the motion sensor sample $S_0$ can be uniquely specified to the line number $L_i$, and records the number 0 linked to the line number $L_i$ together with the pixel value stream ($p_{Li, 1}$, $p_{Li, 2}$, . . . , $p_{Li, n}$) of the line number $L_i$.

In addition, similarly, when the last sample which was acquired before the timing at which the line number $L_j$ depicted in FIG. 3 is read out is the motion sensor sample $S_1$, the synchronization processing portion 22 records a number 1 with which the motion sensor sample $S_1$ can be uniquely specified together with a pixel value stream ($p_{Lj, 1}$, $p_{Lj, 2}$, . . . , $p_{Lj, n}$) of the line number $L_j$.

In such a way, the number with which the motion sensor sample can be uniquely specified is added to every line, so that the synchronization processing portion 22 can synchronize the image sensor 12 and the motion sensor 13 with each other every line. In addition, the relationship between the lines of the image sensor 12, and the line from which the motion sensor sample can be acquired can be specified. Therefore, the interpolation for the motion sensor sample in the line from which the motion sensor sample could not be acquired can also be readily carried out.

As described above, the synchronization processing portion 22 links the sample numbers of the samples outputted thereto from the motion sensor 13 to the line numbers with the timing outputted every line from the image pickup portion 21 as the reference in accordance with the second synchronization system, thereby enabling the image data and the motion sensor output to be synchronized with each other.

Figure 4:
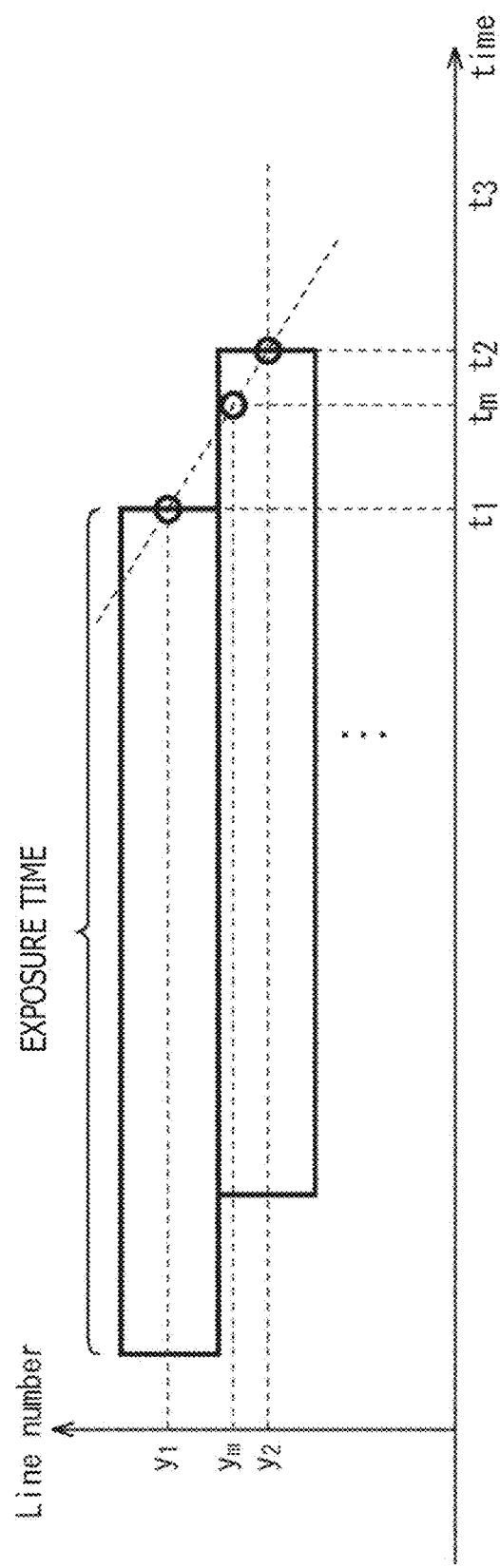
FIG. 4 is a view explaining a third synchronization system.

Next, a mechanism in which the synchronization is carried out by utilizing each of the time stamps of the image sensor 12 and the motion sensor 13 will be described as the third synchronization system with reference to FIG. 4.

Firstly, the third synchronization system is similar to the above-described first synchronization system depicted in FIG. 2 in that the image sensor 12 and the motion sensor 13 are driven independently of each other. Then, in the third synchronization system, the image sensor 12 and the motion sensor 13 shall be each provided insides thereof with mechanisms capable of issuing the time stamps. Specifically, the time stamp(s) is(are) issued based on clocks from processors each built in the image sensor 12 and the motion sensor 13.

For example, the image sensor 12 issues the time stamp specifying the horizontal synchronization and the motion sensor 13 issues the time stamp specifying the timing at which the sample could be acquired. As a result, the horizontal synchronization, and the timing of the sample acquisition can be synchronized with each other, and the line number can be estimated with a sub-pixel as a unit through proportional calculation.

Firstly, it is supposed that the line of the coordinate $y_1$ is read out at read time $t_1$ before and after time $t_m$ at which the motion sensor sample is acquired, and the line of the coordinate $y_2$ is read out at a read time $t_2$. At this time, the line number $y_m$ with a sub-pixel as a unit corresponding to the time $t_m$ at which the motion sensor sample is acquired is expressed by the following expression (1).

[Math 1]

$$y_m = y_1 + \frac{y_2 - y_1}{t_2 - t_1}(t_m - t_1) \quad (1)$$

In such a way, by acquiring the time at which the motion sensor sample is acquired from the motion sensor 13, and the read time for each line from the image sensor 12 based on the time stamps, the synchronization processing portion 22 can more accurately carry out the synchronization. Incidentally, it is necessary that the image sensor 12 and the motion sensor 13 are synchronized with each other by using an arbitrary method, and the time stamps of the image sensor 12 and the motion sensor 13 are made to agree with each other.

As described above, the synchronization processing portion 22 estimates the line number with the sub-pixel as a unit corresponding to the time at which the motion sensor sample is acquired by utilizing the time stamps of the image sensor 12 and the motion sensor 13 in accordance with the third synchronization system, thereby enabling the image data and the motion sensor output to be synchronized with each other.

Next, a mechanism for carrying out the synchronization by using the time stamp common to the image sensor 12 and the motion sensor 13 will be described as the fourth synchronization system with reference to FIG. 5.

FIG. 5 is a block diagram depicting an example of a configuration of the camera module 11 which can use the fourth synchronization system, and of the blocks constituting the camera module 11, the illustration of the blocks unnecessary for the description of the fourth synchronization system is omitted. For example, in the fourth synchronization system, the image sensor 12 and the motion sensor 13 are configured to be connected to a common controller, and this controller has a time stamp issuing unit 19 for issuing the time stamp.

The time stamp issuing unit 19 transmits the time stamps to the image sensor 12 and the motion sensor 13 at timings at which it receives time stamp issue requests each transmitted from the image sensor 12 and the motion sensor 13, respectively.

Firstly, the image sensor 12 reads out the head line of the image at the timing of the first horizontal synchronization. At that timing, the image sensor 12 transmits the time stamp issue requests to the time stamp issuing unit 19. The time stamp issuing unit 19, after receiving the request, transmits the time stamp at that timing to the image sensor 12. Then, the image sensor 12 receives the time stamp specifying the horizontal synchronization to integrate the lines of the image, and outputs the image data with the time stamp. The image sensor 12 repeats the similar operation at the subsequent timings of the horizontal synchronization.

In addition, similarly, the motion sensor 13 makes the time stamp issue request to the time stamp issuing unit 19 whenever the motion sensor output is outputted. Then, the motion sensor 13 outputs the motion sensor output with the time stamp specifying the timing at which the sample could be acquired.

Therefore, based on the time stamp of the image data outputted from the image sensor 12, and the time stamp of the motion sensor output outputted from the motion sensor 13, the synchronization processing portion 22 can carry out the synchronization of the temporal and spatial position relationship between both of them.

It should be noted that even in such a fourth synchronization system, similarly to the third synchronization system described with reference to FIG. 4 described above, the line number with the sub-pixel as the unit can be estimated.

As described above, the synchronization processing portion 22 can synchronize the image data and the motion sensor output with each other in accordance with the fourth synchronization system by using the common time stamp.

Next, a mechanism for acquiring the sample of the motion sensor 13 every number of fixed lines of the image sensor 12 will be described as the fifth synchronization system with reference to FIG. 6.

For example, in the case where a sampling rate $N_M$ (Hz) of the motion sensor 13 is indivisible by a frame rate $N_I$ (frames/second) of the image sensor, the number of samples of the motion sensor 13 which can be acquired in one frame differs every frame.

Figure 6:
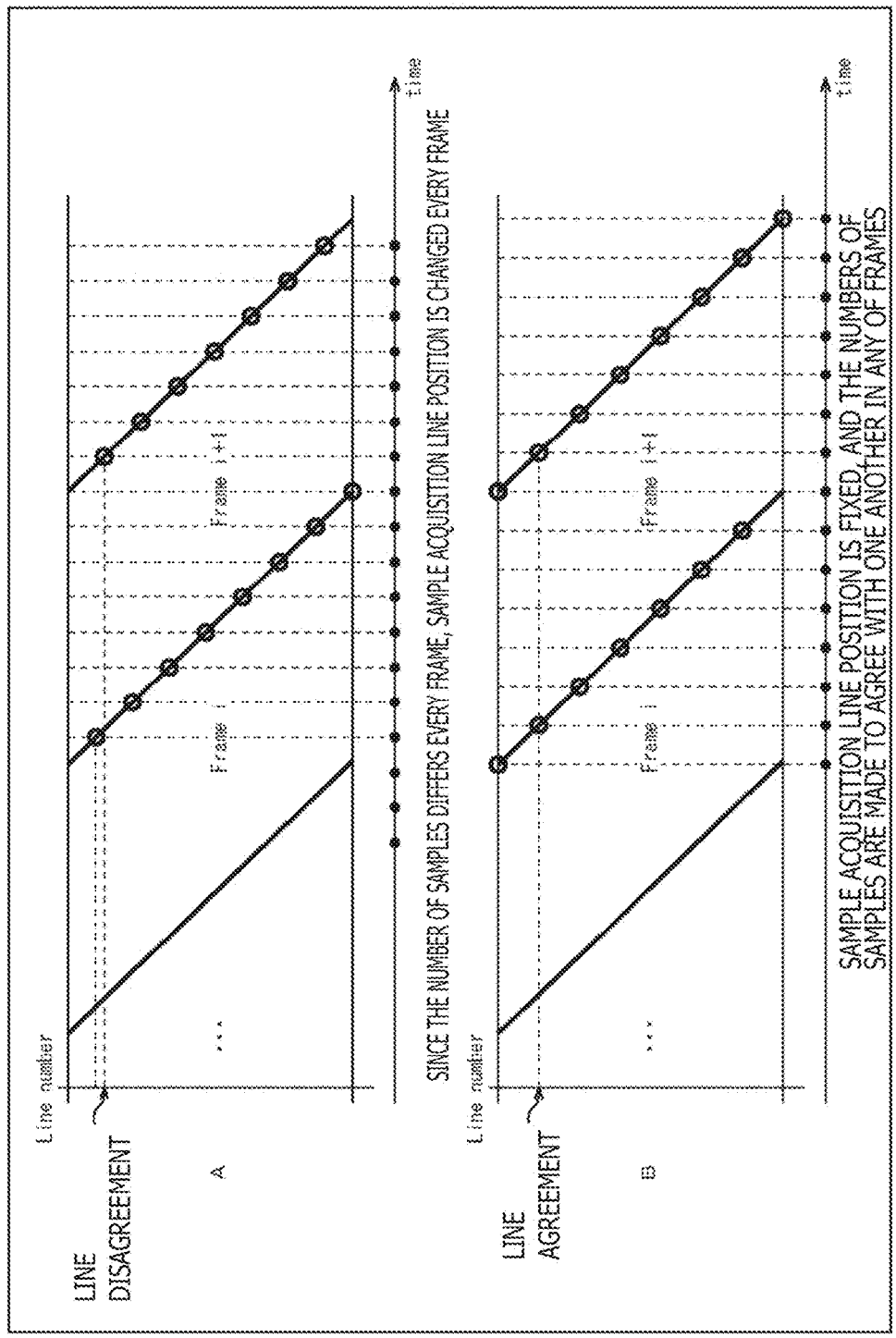
FIG. 6 is a view explaining a fifth synchronization system.

Therefore, in this case, as depicted in A of FIG. 6, the line from which the sample can be acquired in the frame i, and the line from which the sample can be acquired in the next frame i+1 do not agree with each other. When for example, the sampling rate of the motion sensor 13 is 1,000 (Hz), and the frame rate is 60 (frames/second), a ratio of the former to the latter is 1,000/60≈16.7. From this fact, the number of samples of the motion sensor 13 which can be acquired in a certain frame is 16, whereas for convenience of the sampling, the number of samples of the motion sensor 13 which can be acquired in another frame is 17 in some cases.

However, when the number of samples which can be acquired every frame is fixed, this is convenient in terms of the system design in many cases. For this reason, in the camera module 11, the sampling rate $N_M$ of the motion sensor 13 is set so as to become the number which is divisible by the frame rate $N_I$ of the image sensor 12. As a result, the sample of the motion sensor 13 can be usually acquired in a specific line of the image sensor 12.

That is to say, as depicted in B of FIG. 6, the line from which the sample can be acquired in the frame i, and the line from which the sample can be acquired in the next frame i+1 agrees with each other. In a word, the sample of the motion sensor 13 can be acquired every number of specific fixed lines. When, for example, the frame rate is 60 (frames/second), by setting the sampling rate of the motion sensor 13 to 1,200 Hz, 20 samples can be necessarily acquired every frame. As a result, when the total number of lines of the image is H, the sample of the motion sensor 13 can be acquired every H/20 lines.

As described above, the synchronization processing portion 22 acquires the sample of the motion sensor 13 every number of fixed lines of the image sensor 12 in accordance with the fifth synchronization system, thereby enabling the image data and the motion sensor output to be synchronized with each other.

It should be noted that the synchronization system in accordance with which the synchronization processing portion 22 synchronizes the image data and the motion sensor output with each other is not limited to the mechanism as have been described, and thus other various mechanisms can also be used instead.

<With Respect to Motion Sensor Output>

Figure 7:
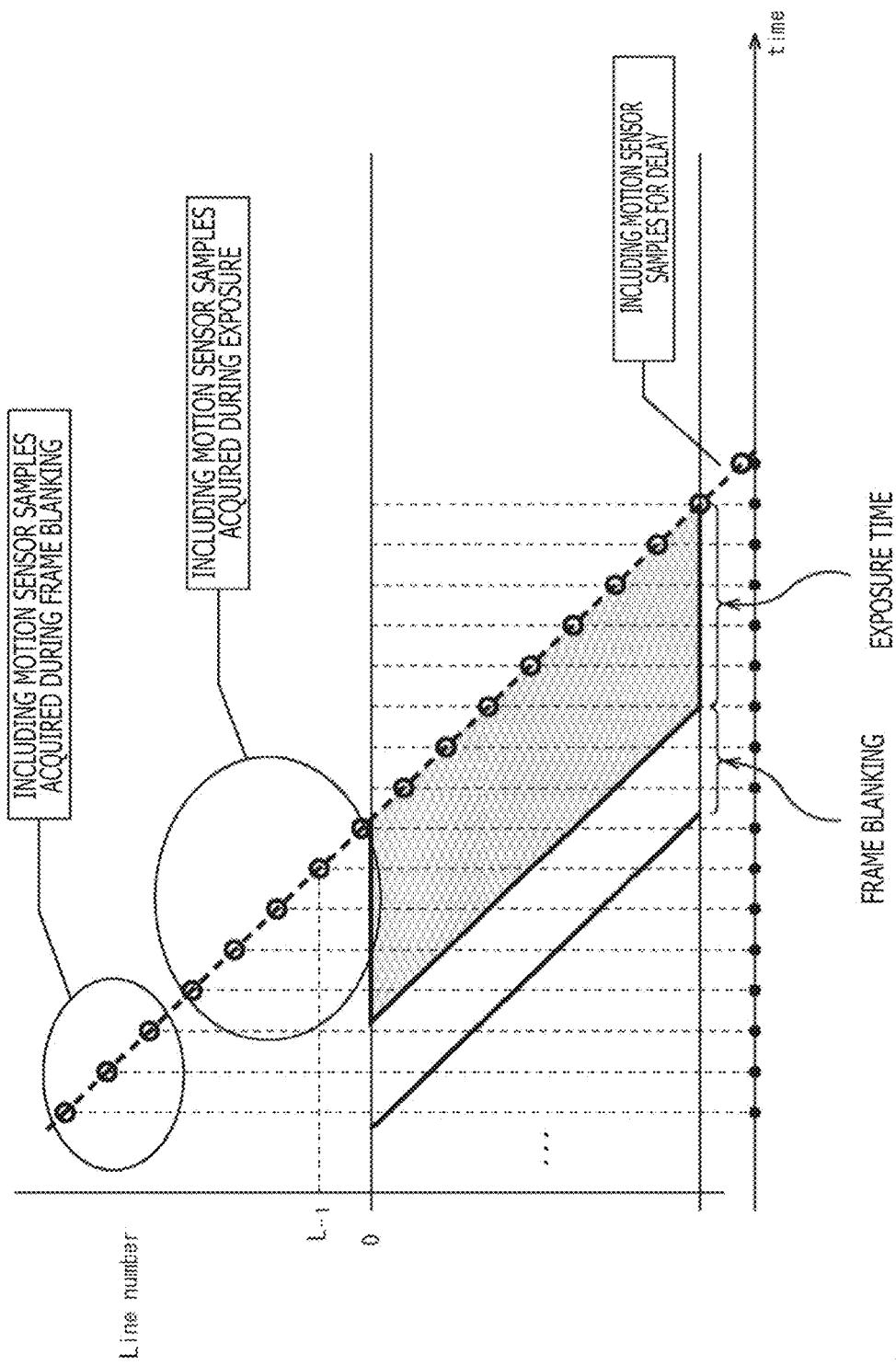
FIG. 7 is a view explaining a time range of a motion sensor output.

A description will now be given with respect to a time range of the motion sensor output which is outputted concurrently with one sheet of frame with reference to FIG. 7.

For example, in outputting one sheet of certain frame, only with the motion sensor output which can be acquired at the time of the reading of each line constituting the certain frame, all the motions in the time range in which the certain frame is captured cannot be reproduced. That is to say, the motion information during the exposure of the first line of the certain frame requires the motion sensor output which can be acquired at the time of the reading of the frame before the certain frame. In addition, the motion information on the time (frame blanking) when the exposure between the frame and the frame is not carried out is useful for estimating the movement amount between these frames.

Therefore, the camera module 11 outputs the motion sensor output which is acquired during the exposure of the first line of a certain frame, and the motion sensor output which is acquired during the frame blanking before the exposure of the certain frame is started together with the image of the certain frame.

Moreover, the delay having a decided length occurs between the motion sensor 13 and the image sensor 12 for some reason. For example, a delay of the processing, in a substrate, for correcting the motion sensor 13 and the image sensor 12 to each other, or the like corresponds to that delay. If the delay amount concerned is fixed, the camera module 11 outputs the output together with the frame concerned, including the motion sensor output in consideration of the fixed delay amount.

Incidentally, when the line number is used in the synchronization method of synchronizing the image sensor 12 and the motion sensor 13 with each other, a minus value (for example, $L_{-1}$) has to be added to the line number which is allocated to the motion sensor output before one frame. In addition, for example, when the allocation is carried out to the motion sensor output after one frame, it is only necessary to use a value obtained by adding the number of lines in the next frame to the total number of lines of the image.

As described above, in outputting one sheet of certain frame, the image sensor 12 outputs not only the motion sensor output which can be acquired at the time of the reading of the lines constituting the certain frame, but also the motion sensor outputs during the frame blanking, during the exposure, and for the delay in association with each other. In such a way, the synchronization processing portion 22 outputs the motion sensor output for a predetermined period of time before or after the image for one frame is captured, including the image for one frame, thereby enabling the more accurate image stabilization to be carried out by using these motion sensor outputs.

<With Respect to Electronic Image Stabilization in which Lens Distortion is Taken into Consideration>

A description will now be given with respect to the electronic image stabilization in which the lens distortion is taken into consideration with reference to FIG. 8 to FIG. 11.

Hereinafter, in general, there has been used the system in which the lens distortion correcting processing and the image stabilization processing are each executed for all the pixels, and the image is produced whenever these pieces of processing are executed.

For example, as depicted in FIG. 8, firstly, the lens distortion correcting processing is executed for all the pixels of the input image containing the lens distortion and the camera shake, and produces the distortion-corrected image. Next, the image stabilization processing is executed for all the pixels of the resulting distortion-corrected image, and the final corrected image is outputted. In this system, however, since the distortion-corrected image which is not finally utilized was produced as the intermediate image, the unnecessary memory band was used.

Then, the camera module 11 adopts the system for executing the lens distortion correcting processing and the image stabilization processing at once without producing the unnecessary intermediate image.

For example, both a coordinate transformation function $T_d(x, y)$ for the lens distortion correction, and a coordinate transformation function $T_s(x, y)$ for the image stabilization shall comply with a backward system (a system for, when the coordinates after the transformation are handed over, returning back the coordinates before the transformation). Here, in a deformation in which the lens distortion correcting processing and the image stabilization processing as depicted in FIG. 8 are successively executed, as depicted in FIG. 9, the processing is executed in two stages.

Figure 9:
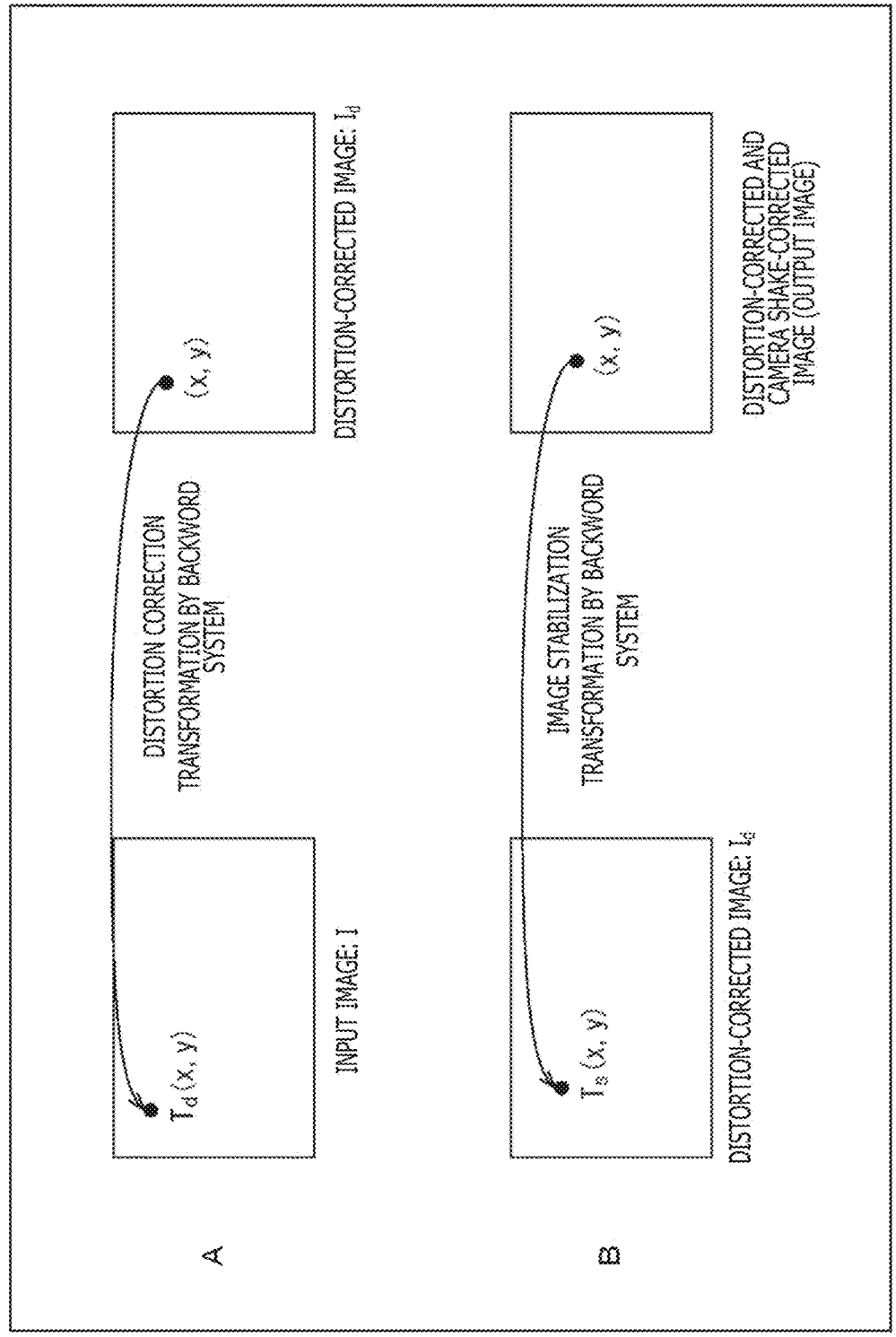
FIG. 9 is a diagram explaining coordinate transformation which is carried out in two steps.

Firstly, as depicted in A of FIG. 9, the distortion correcting transformation is carried out in such a way that the coordinates of an input image I is transformed into the coordinates of a distortion-corrected image $I_d$ by the coordinate transformation function $T_d(x, y)$ for the lens distortion correction, and the distortion-corrected image $I_d$ as the intermediate image is produced. This distortion correcting conversion formula complying with the backward system is expressed by the following expression (2).

[Math 2]

$$I_d(x,y)=I(T_d(x,y)) \qquad (2)$$

Next, as depicted in B of FIG. 9, the image stabilization transformation is carried out in such a way that the coordinates of the distortion-corrected image $I_d$ is transformed into coordinates of a distortion-corrected image and a camera shake-corrected image $I_r$ by the coordinate transformation function $T_s(x, y)$ for the image stabilization, and the output image as the final transformation result is outputted. This image stabilization transformation formula complying with the backward system is expressed by the following expression (3).

[Math 3]

$$I_r(x,y)=I_d(T_s(x,y)) \quad (3)$$

Incidentally, in such processing, actually, one coordinate is merely continuously transformed. Therefore, even when two deformations depicted in A of FIGS. 9 and B of FIG. 9 are put in one change, the same transformation result can be obtained.

Figure 10:
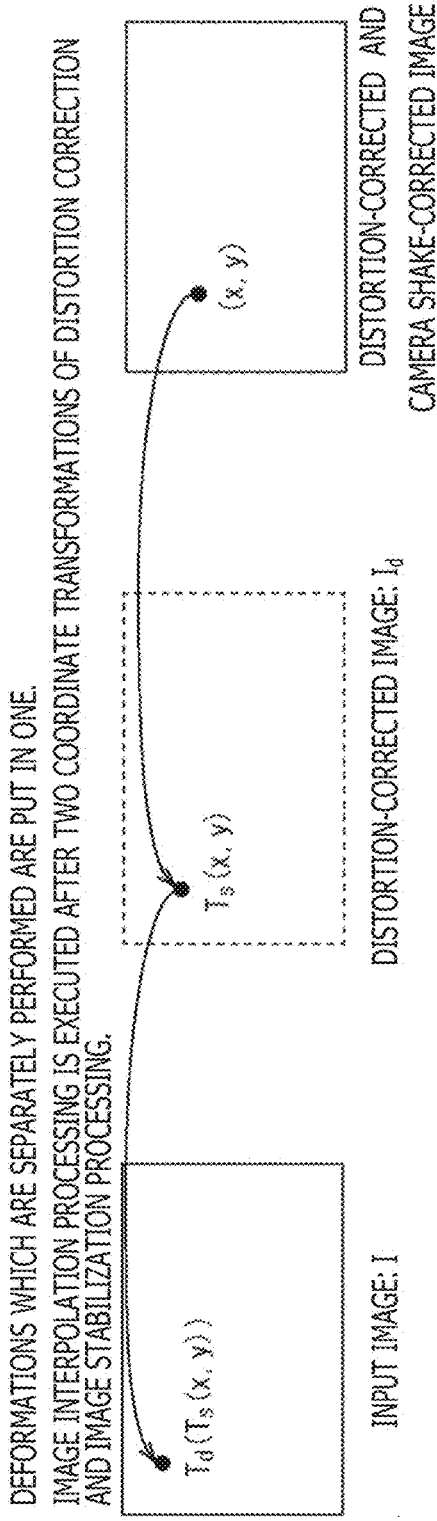
FIG. 10 is a diagram explaining coordinate transformation which is carried out at once.

Then, the camera module 11 carries out the coordinate transformation at once in accordance with a system as depicted in FIG. 10.

As depicted in FIG. 10, the coordinates of the input image I is transformed into the coordinates of the distortion-corrected and camera shake-corrected image $I_s$ without producing the distortion-corrected image $I_d$ by a coordinate transformation function $T_d(T_s(x, y))$ used in executing the lens distortion correcting processing and the image stabilization processing at once. A distortion and camera shake transformation formula complying with the backward system is expressed by the following expression (4).

[Math 4]

$$I_s(x,y)=I(T_d(T_s(x,y))) \quad (4)$$

If this system is adopted, when only the coordinate values are continuously transformation-processed, it is avoided to produce the intermediate image (distortion-corrected image $I_d$) which is not finally used from the input image I, and the distortion-corrected and camera shake-corrected image $I_s$ can be outputted in which the distortion and the camera shake are corrected at the same time. As a result, for the camera module 11, a memory amount and a calculation amount can be reduced, and the large advantage can be obtained for the system configuration.

Figure 11:
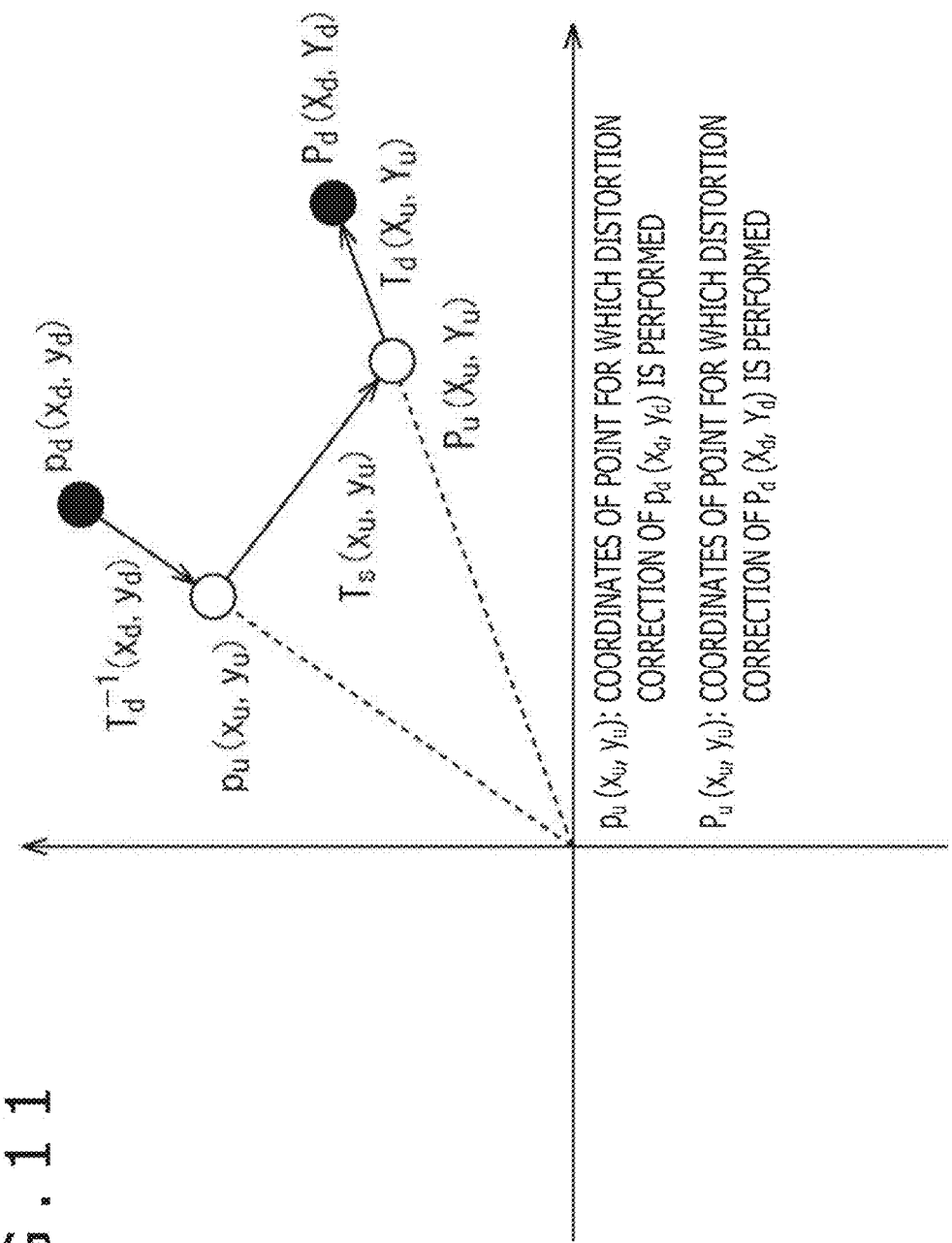
FIG. 11 is a view explaining a concrete method of correcting a lens distortion and camera shake.

Next, a concrete method of correcting the lens distortion and the camera shake will now be described with reference to FIG. 11 and FIG. 12.

For example, it is supposed that the image sensor 12 is rotated at an angle $-\theta_p$ (rad) of rotation in a pitch direction, rotated at an angle $-\theta_y$ (rad) of rotation in a yaw direction, and rotated at an angle $-\theta_r$ (rad) of rotation in a roll direction. At this time, an image stabilization relational expression disclosed in PTL 1 described, that is, the following expression (5) is established between a point $p_u$ of the coordinates $(x_u, y_u)$, and a point $P_u$ of the coordinates $(X_u, Y_u)$ in the image coordinate system containing no distortion depicted in FIG. 11.

[Math 5]

$$\begin{cases} X_u = L(\tan(\alpha + \theta_y)) + x_u \frac{\cos\beta}{\cos(\beta + \theta_p)} + x_u\cos\theta_r - y_u\sin\theta_r - 2x_u \\ Y_u = L(\tan(\beta + \theta_p)) + y_u \frac{\cos\alpha}{\cos(\alpha + \theta_y)} + x_u\sin\theta_r + y_u\cos\theta_r - 2y_u \end{cases} \quad (5)$$

$$\tan\alpha = \frac{x_u}{L} \quad \tan\beta = \frac{y_u}{L}$$

Incidentally, in the expression (5), a focal length L is obtained by converting a focal length in an optical central position of the image sensor into the number of pixels. In a word, the image stabilization relational expression of the expression (5) represents the coordinate transformation function $T_s(x, y)$ for the image stabilization described with reference to FIG. 9 and FIG. 10 described above. Here, with respect to the coordinate transformation function $T_d(x, y)$ for an arbitrary lens distortion correction complying with the backward system, in the image stabilization processing and the lens distortion correcting processing, the transformation complying with the following expression (6) is carried out.

[Math 6]

$$\begin{cases} [X_u, Y_u] = T_s(x_u, y_u) \\ [X_d, Y_d] = T_d(X_u, Y_u) \end{cases} \quad (6)$$

The coordinates $(X_u, Y_u)$ before the image stabilization for a certain coordinates $(x_u, y_u)$ of the coordinate system of the output image is carried out are calculated by carrying out the transformation complying with the expression (6). In addition, the coordinates $(X_d, Y_d)$ before the lens distortion correction is carried out for the coordinates $(X_u, Y_u)$ are calculated. Since the correspondence relationship between the coordinates of the output image, and the coordinates of the input image is obtained in such a manner, the lens distortion correction and the image stabilization can be carried out at the same time without producing the intermediate image.

Incidentally, when the lens distortion is desired to be daringly added to the output image, not the coordinates $(x_u, y_u)$ of the point $p_u$ in which the distortion correction is carried out, but the coordinates $(x_d, y_d)$ of the point $p_d$ in the coordinate system containing the distortion has to be used as the coordinates outputted in the processing described above. For such processing, for example, a coordinate transformation inverse function $T_d^{-1}(x, y)$ has to be used as an inversion function of the coordinate transformation function $T_d(x, y)$, and the transformation is carried out in accordance with the following expression (7).

[Math 7]

$$[x_u, y_u]=T_d^{-1}(x_d, y_d)$$

$$[X_u, Y_u]=T_s(x_u, y_u)$$

$$[X_d, Y_d]=T_d(X_u, Y_u) \quad (7)$$

Here, a description will now be given with respect to two lens distortion processing methods which are actually utilized in the camera module 11.

Firstly, a first lens distortion processing method is a correction method corresponding to a lens distortion model by Brown-Conrady. In this model, the distortions in both in a meridional direction and in a sagittal direction are expressed as the following expression (8) by using parameters $k_1$, $k_2$, $k_3$, $p_1$, and $p_2$ used in the distortion correction, and the normalized coordinates $(x_d, y_d)$ and $(x_u, y_u)$ with the optical center before and after the distortion correction as the origin.

[Math 8]

$$\begin{cases} x_d = x_u(1 + k_1r^2 + k_2r^4 + k_3r^6) + 2p_1x_uy_u + p_2(r^2 + 2x_u^2) \\ y_d = y_u(1 + k_1r^2 + k_2r^4 + k_3r^6) + 2p_2x_uy_u + p_1(r^2 + 2x_u^2) \end{cases} \quad (8)$$

However, since parameters used in the expression (8) are values peculiar to the lens, the parameters need to be measured in advance. A measurement operation for measuring the parameters in advance is referred to as camera calibration, and various methods have been proposed. Of them, in general, the method of Zhang (NPL 1 described above) for imaging a checkerboard by using the lens parameters of which are desired to be measured is frequently utilized.

That is to say, the degree of a distortion of lattice points of the checkerboard is fitted to the expression (8), thereby measuring the parameters. After once the parameters are measured, the coordinates $(X_d, Y_d)$ before the distortion correction corresponding to the objective coordinates $(x_u, y_u)$ after the distortion correction has to be calculated, and the pixel values acquired in that position has to be decided as the pixel values of the coordinates after the distortion correction. In addition, since if the parameters are decided, the distortion correction amount for each coordinate becomes constant, it is also possible to have a table for holding therein the movement amounts corresponding to the coordinates.

Next, a description will now be given with respect to a correction method of putting the distortion amounts in the table with the image height as a key as a second lens distortion processing method.

The lens distortion includes a component in the meridional direction, and a component in the sagittal direction. In this case, however, since the component in the sagittal direction is smaller than the component in the meridional direction, the component in the meridional direction can be approximated as a function in the meridional direction, in a word, only as a function of an image height. Therefore, when it is assumed that a point imaged in a position at a distance $r_d$ in an optical system containing the distortion is imaged in a position at a distance $r_u$ from an optical center in an optical system containing no distortion, the distance $r_d$ can be expressed by the following expression (9) by using a distortion ratio function D of the distance from the optical center.

[Math 9]

$$r_d = r_u D(r_u) \qquad (9)$$

This distortion ratio function D is measured in advance based on the lens design data or the measured values, thereby enabling the image stabilization processing in which the lens distortion is taken into consideration to be executed. Here, a description will now be given with respect to the procedures in the image stabilization processing in which the lens distortion is taken into consideration.

Firstly, in a first procedure, there is specified the coordinates $(x_u, y_u)$ in the coordinate system of the image (output image), after the image stabilization, which contains no distortion. Next, in a second procedure, the coordinates $(x_u, y_u)$ are applied to the image stabilization relational formula determined depending on the angle of rotation of the image sensor 12, thereby calculating the coordinates $(X_u, Y_u)$ in the image before the image stabilization, which contains no distortion. Then, in a third procedure, the coordinates $(X_d, Y_d)$ in the image, before the image stabilization, containing the distortion is calculated by using the distortion ratio function D caused by the distortion. This arithmetic operation can be expressed as the following expression (10).

[Math 10]

$$\begin{cases} X_d = X_u \cdot D(R_u) \\ Y_d = Y_u \cdot D(R_u) \\ R_u = \sqrt{X_u^2 + Y_u^2} \end{cases} \qquad (10)$$

Moreover, in a fourth procedure, the pixel value in the coordinates $(X_d, Y_d)$ is acquired, and is decided and a pixel value in the coordinates $(x_u, y_u)$ of the output image.

It should be noted that the distortion ratio function D, for example, may be made a function of the square of a distance ($r^2$) in order to simplify the arithmetic operation. In addition, when the lens distortion is desired to be daringly left in the output image, the coordinate transformation has to be carried out by applying the distortion ratio function to the coordinates $(x_u, y_u)$ described above to obtain the coordinates $(x_d, y_d)$. Then, the pixel value in the position concerned has to be acquired in accordance with the fourth procedure described above.

In addition, the lens distortion within an image surface is imaged, and the focal length L of the image stabilization system is changed depending on the image surface position, so that only by applying the single correction system, the lens distortion and the camera shake can be corrected at the same time. In a word, the image can be corrected in correspondence to a difference in influence between the camera shake and the distortion corresponding to the position within the surface of the image. This system will be described below.

Similarly to the case described above, it is supposed that the image sensor 12 is rotated at an angle $-\theta p$ (rad) of rotation in the pitch direction, rotated at an angle $-\theta y$ (rad) of rotation in the yaw direction, and rotated at an angle $-\theta r$ (rad) of rotation in the roll direction. At this time, the image stabilization relational expression disclosed in PTL 1 described above is established between a point $p_u$ of the coordinates $(x_u, y_u)$, and a point $P_u$ of the coordinates $(X_u, Y_u)$. This relational formula is expressed by the following expression (11).

[Math 11]

$$\begin{cases} X_u = L(\tan(\alpha + \theta_y)) + x_u \dfrac{\cos\beta}{\cos(\beta + \theta_p)} + x_u\cos\theta_r - y_u\sin\theta_r - 2x_u \\ Y_u = L(\tan(\beta + \theta_p)) + y_u \dfrac{\cos\alpha}{\cos(\alpha + \theta_y)} + x_u\sin\theta_r + y_u\cos\theta_r - 2y_u \end{cases} \qquad (11)$$

$$\tan\alpha = \dfrac{x_u}{L} \quad \tan\beta = \dfrac{y_u}{L}.$$

Here, in the expression (11), a focal length L of the image stabilization relational formula is obtained by converting a focal length in an optical central position of the image sensor into the number of pixels.

For example, in an ideal lens containing no lens distortion, this focal length is constant irrespective of the positions on the image surface. However, in the actual lens, the focal distance can be regarded as differing depending on the positions on the image surface due to the distortion. Then, a virtual focal length $L_p(x_u, y_u)$ in the pitch direction, and a virtual focal length $L_y(x_u, y_u)$ in the yaw direction in the image surface position are measured in advance. Then, the image stabilization relational formula described above is utilized by using the focal lengths $L_p(x_u, y_u)$ and $L_y(x_u, y_u)$, thereby enabling the coordinate transformation in which the distortion is taken into consideration to be carried out. This relational formula is expressed by the following expression (12).

[Math 12]

$$\begin{cases} X_d = L_y(x_u, y_u) \cdot (\tan(\alpha + \theta_y)) + x_u \dfrac{\cos\beta}{\cos(\beta + \theta_p)} + \\ \qquad x_u\cos\theta_r - y_u\sin\theta_r - 2x_u \\ Y_d = L_p(x_u, y_u) \cdot (\tan(\beta + \theta_p)) + y_u \dfrac{\cos\alpha}{\cos(\alpha + \theta_y)} + \\ \qquad x_u\sin\theta_r + y_u\cos\theta_r - 2y_u \end{cases} \quad (12)$$

$$\tan\alpha = \dfrac{x_u}{L_y(x_u, y_u)} \quad \tan\beta = \dfrac{y_u}{L_p(x_u, y_u)}$$

Figure 12:
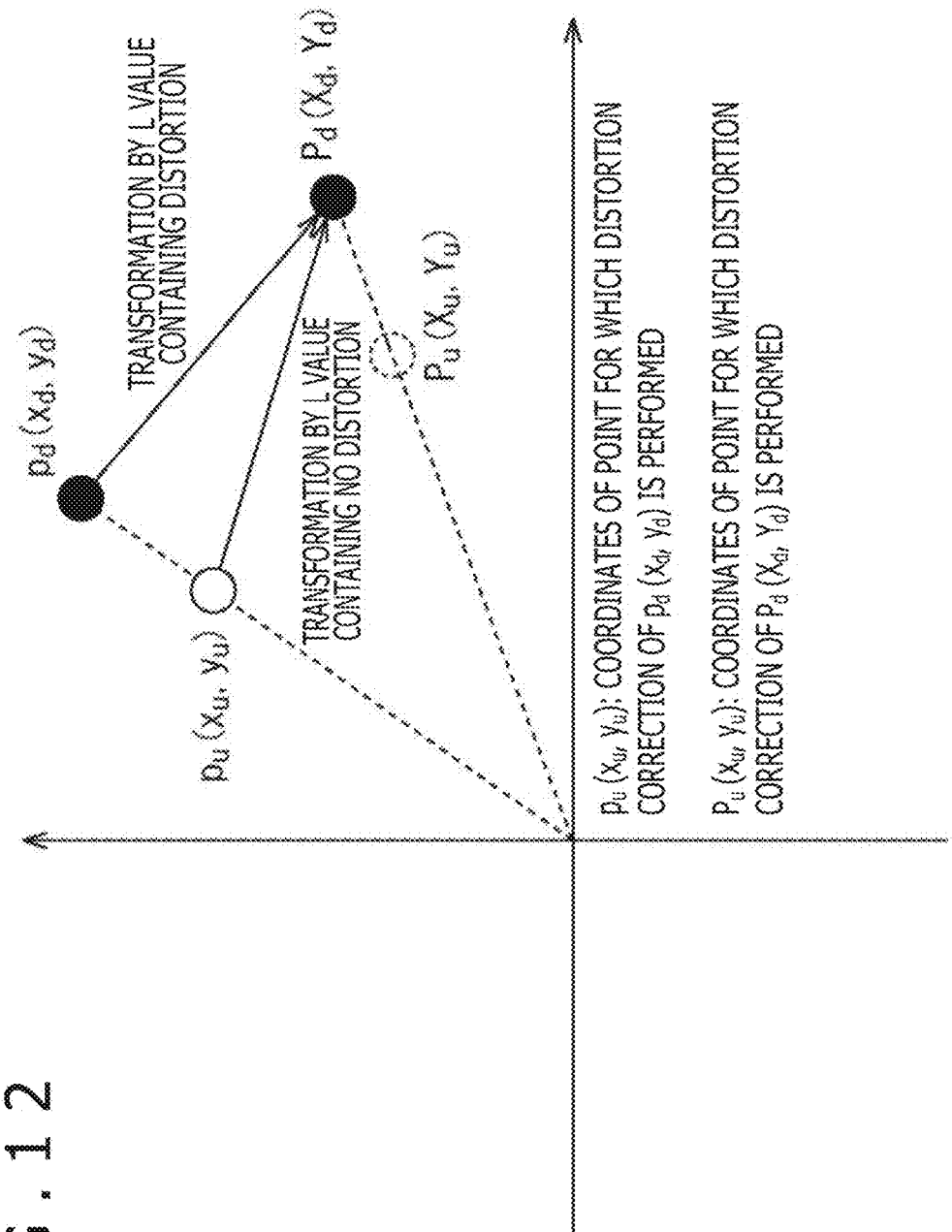
FIG. 12 is a view explaining a concrete method of correcting a lens distortion and camera shake.

FIG. 12 is a view explaining the transformation system utilizing the expression (12). Hereinafter, concrete transformation procedures will be described.

Firstly, in a first procedure, there is specified the coordinates $(x_u, y_u)$ in the coordinate system of the image (output image), after the image stabilization, which contains no distortion. Next, in a second procedure, the coordinates $(x_u, y_u)$ are applied to the image stabilization relational formula determined depending on the angle of rotation of the image sensor 12 and the focal length in the image surface position concerned, thereby calculating the coordinates $(X_d, Y_d)$ in the image, before the image stabilization, which contains the distortion. Then, in a third procedure, a pixel value in the coordinates $(X_d, Y_d)$ is acquired. Then, this pixel value is decided as a pixel value in the coordinates $(x_u, y_u)$ of the output image.

It should be noted that the measurement of the focal length $L(x_u, y_u)$ in the image surface position can be realized by using two methods which will be next described.

Firstly, in a first method, the image is actually captured together with the motion sensor data. In this case, the image stabilization processing by the motion sensor, and the image stabilization processing by the image processing such as an optical flow or block matching are both executed. Then, both of them are compared with each other, thereby obtaining the virtual focal length $L(x_u, y_u)$. In this first method, both the movement amounts agree with each other in the area in which the distortion is not contained at all, whereas both the movement amounts are different from each other in the area in which the distortion is contained. As a result, a difference between both the movements is set as zero, so that the virtual focal lengths $L_p(x_u, y_u)$ and $L_y(x_u, y_u)$ can be obtained.

Next, a second method is a method utilizing lens design data. That is to say, utilizing the lens design data enables all the pieces of optical information to be realized. Therefore, by utilizing this fact, the virtual focal length $L(x_u, y_u)$ can be estimated.

The transformation using the focal lengths $L_p(x_u, y_u)$ and $L_y(x_u, y_u)$ obtained in such a manner is carried out to transform the point $p_u$ of the coordinates $(x_u, y_u)$ into the point $P_d$ of the coordinates $(X_d, Y_d)$ as depicted in FIG. 12. Thereby, the camera shake and the distortion can be corrected.

Incidentally, when the lens distortion is desired to be daringly added to the output image, not the coordinates $(x_u, y_u)$ of the point $p_u$ in which the distortion correction is carried out, but the coordinates $(x_d, y_d)$ of the point $p_d$ in the coordinate system containing the distortion has to be used as the coordinates outputted in the processing described above. In this case, the virtual focal lengths $L_p$ and $L_y$ described above are obtained in advance with the lens distortion being contained therein, thereby enabling this processing to be realized. That is to say, as depicted in FIG. 12, by carrying out the transformation using the focal lengths $L_p(x_d, y_d)$ and $L_y(x_d, y_d)$, the point $p_d$ of the coordinates $(x_d, y_d)$ has to be transformed into the point $P_d$ of the coordinates $(X_d, Y_d)$.

<With Respect to Lens Distortion Correcting Processing and Image Stabilization Processing for Control Pixels>

A description will now be given with respect to the lens distortion correcting processing and the image stabilization processing for the control pixels with reference to FIG. 13 to FIG. 15.

In general, although depending on the degree of the distortion and camera shake generated, the lens distortion correcting processing and the image stabilization processing do not need to be necessarily accurately executed for all the pixels. For example, the accurate correcting processing is executed only for a part of the pixels, and the area surrounded by these pixels can be approximated while the image quality is maintained by the simple interpolation processing utilizing the pixels for which the correcting processing is executed.

Then, the camera module 11 adopts a method in which the accurate lens distortion correcting processing and image stabilization processing are executed only for the specific control pixels, and the simple interpolation processing is executed for the pixels other than the control pixels using these control pixels, thereby finally correcting the whole image. Hereinafter, a description will be given with respect to a processing method using the control pixels.

Firstly, a description will now be given with respect to an arrangement example in which the control pixels are arranged within the image with reference to FIG. 13.

In FIG. 13, the control pixel is represented by an open circle (∘). For example, A of FIG. 13 depicts an arrangement example in which the control pixels are arranged in lattice, and B of FIG. 13 depicts an arrangement example in which the control pixels are arranged in triangular shape. In addition, C of FIG. 13 depicts an arrangement example in which the control pixels are arranged in all the pixels (all the coordinates). In this case, only a part of the control pixels in a first column of top left is illustrated. It should be noted that the arrangement example depicted in C of FIG. 13 is said as the lattice-shaped arrangement in a specific case where a length of one side is set as one pixel.

The reason why the control pixels are arranged in lattice or triangle in such a way is because the compatibility with Computer Graphics (CG) is taken into consideration. For example, in the CG, in general, an object shape is expressed by a polygon, and the texture coordinates are allocated to the apex of the polygon, thereby carrying out the rendering as if the object is more like the actual object. The camera module 11 adopts such an arrangement of the control pixels in such a way that not only the simplification of the calculation, but also the frame work of the CG can be used at the time of the output of the image in which the image stabilization is carried out.

Next, a description will be given with respect to an arrangement density of the control pixels with reference to FIG. 14.

The camera module 11 may adopt any of an arrangement example in which as depicted in A of FIG. 14, the control pixels are uniformly arranged, and an arrangement example in which as depicted in B of FIG. 14, the control pixels are non-uniformly arranged. For example, as depicted in B of FIG. 14, the control pixels are non-uniformly arranged, thereby being able to cope with the dense image deformation as well without changing the number of control pixels in the whole image.

That is to say, when the lens distortion shape is intricately changed in the periphery of the image, the control pixels are densely arranged in the position where a change in distortion is especially complicated, while the control pixels are sparsely arranged in any of the positions other than that position, thereby enabling the accuracy of the lens distortion correcting processing to be maintained without changing the number of control pixels. In addition, the control pixels are densely arranged in the area in which a change in angle of rotation based on the detection by the motion sensor 13 is large, while the control pixels are sparsely arranged in the area in which a change in angle of rotation is small, thereby enabling the effect of the image stabilization to be enhanced without changing the total number of control pixels.

Incidentally, the number of control pixels can also be changed every frame. For example, in the frame having the less motion, the total number of control pixels can be reduced, or the control pixels can be arranged in the area in which the change resulting from the camera shake of the image sensor 12 is large. The effect of the image correction can be increased by using such a method of arranging the control pixels, and at the same time, the calculation efficiency can be enhanced.

For example, in the camera module 11, the calculation necessary for the image correction is carried out only for the control pixels, and the interpolation processing is executed for the pixels other than the control pixels based on the triangular or rectangular shape. In a word, as the number of control pixels is less, the number of pixels necessary for carrying out the complicated arithmetic operation is reduced. Therefore, for reducing the number of control pixels to the minimum, and enhancing the correction effect, for example, it becomes important to suitably adopt the non-uniform arrangement as depicted in B of FIG. 14.

Next, a description will now be given with respect to a method of interpolating the pixels other than the control pixels with reference to FIG. 15.

Figure 15:
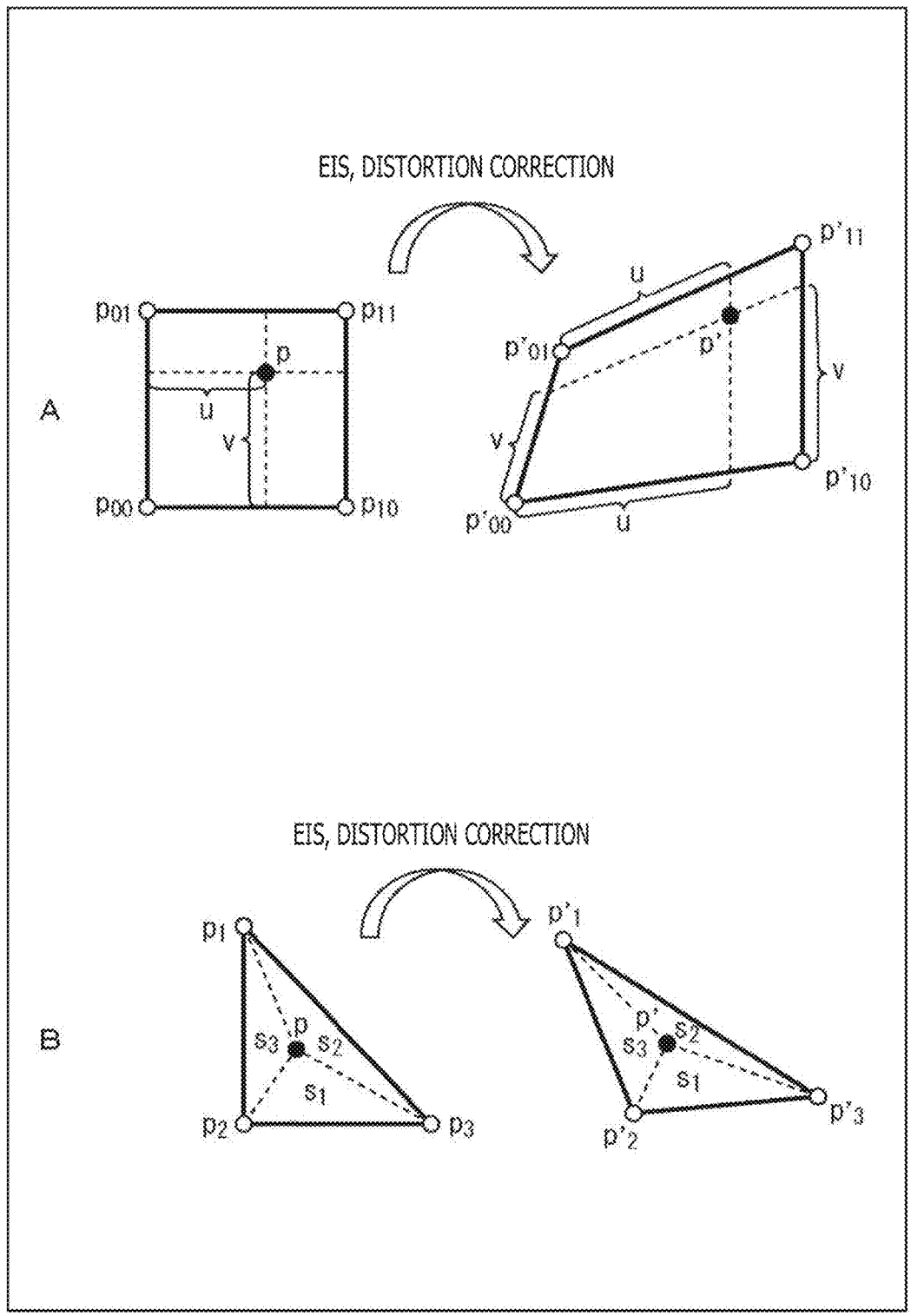
FIG. 15 is a view explaining a method of interpolating pixels other than the control pixels.

For example, when the control pixels are arranged in a rectangular shape, bilinear interpolation as depicted in A of FIG. 15 is applied. In addition, when the control pixels are arranged in a triangular shape, center-of-gravity coordinate interpolation as depicted in B of FIG. 15 is applied.

As depicted in A of FIG. 15, in the bilinear interpolation, the pixels other than the control pixels are interpolated based on the control pixels arranged in the rectangular shape. For example, when an internally dividing point p having a ratio (u:v) is deformed in the inside of the rectangular shape in which the control pixels are arranged at an apex $p_{00}$, an apex $p_{10}$, an apex $p_{01}$, and an apex $p_{11}$, the coordinates of the internally dividing point p' after the deformation are calculated as depicted in the following expression (13) by the bilinear interpolation. That is to say, the coordinates of the internally dividing point p' corresponding to the internally dividing point p are calculated based on the ratio (u:v) for the coordinates of an apex $p_{00}'$, an apex $p_{10}'$, an apex $p_{01}'$, and an apex $p_{11}'$ of the control pixels after the deformation.

[Math 13]

$$p' = (1-u)(1-v)p_{00}' + (1-u)p_{10}' + u(1-v)p_{01}' + uvp_{11}' \quad (13)$$

Then, after the coordinates after the deformation caused by the electronic image stabilization (EIS) and the distortion correction has been acquired, the pixel value in that position is acquired by carrying out the sub-sampling. For example, the general re-sampling method such as nearest neighbor, bilinear, bicubic, or anisotropic filtering can be utilized as the re-sampling. Incidentally, the interpolation processing can utilize the texture interpolation processing in the CG. Therefore, the high-speed processing by the hardware can be executed by using a Graphics Processing Unit (GPU). By executing the high-weight and light-speed interpolation processing, the effect can be approximated for the pixels other than the control pixels based on the coordinates of the peripheral control pixels without carrying out the calculation of the lens distortion correcting processing and the image stabilization processing for all the pixels.

In addition, as depicted in B of FIG. 15, in the center-of-gravity coordinate interpolation, the pixels other than the control pixels are interpolated based on the control pixels arranged in the triangular shape. Firstly, in the center-of-gravity coordinate interpolation, in the triangle before the deformation, an area $S_1$, an area $S_2$, and an area $S_3$ of partial triangles determined by a certain one internally dividing point p are calculated in advance. Next, the coordinates of the integrally dividing point p' after the deformation caused by the electronic image stabilization (EIS) and the distortion correction can be calculated in accordance with the following expression (14) by using the area $S_1$, the area $S_2$, and the area $S_3$ of the partial triangles previously obtained, and coordinates of an apex $p_1'$, an apex $p_2'$, and an apex $p_3'$ after the deformation.

[Math 14]

$$p' = \frac{s_1}{s_1+s_2+s_3}p_1' + \frac{s_2}{s_1+s_2+s_3}p_2' + \frac{s_3}{s_1+s_2+s_3}p_3' \quad (14)$$

Then, after the coordinates of internally dividing point p' is calculated, similarly to the case of the bilinear interpolation described above, the pixel values of the original image are acquired by using some kind of re-sampling method.

<With Respect to Correction Result Outputting System>

A description will now be given with respect to a system for outputting the correction results in the camera module 11 with reference to FIG. 16 to FIG. 20. It should be noted that in FIG. 16 to FIG. 20, of the blocks constituting the camera module 11 depicted in FIG. 1, the illustration of the blocks unnecessary for the description of the correction result outputting system are omitted. For example, in the camera module 11, the correction results are outputted by using five systems as will be described below.

Figure 16:
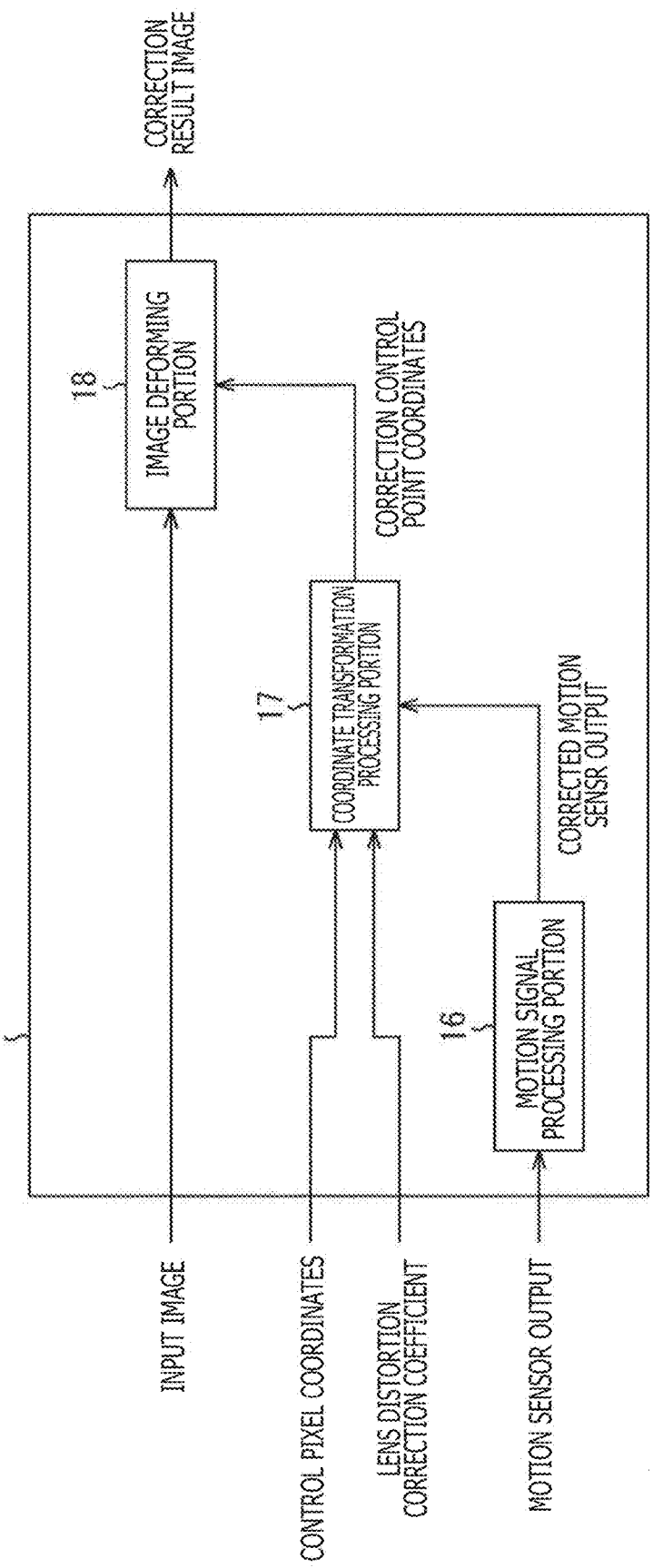
FIG. 16 is a block diagram explaining a first correction result outputting system.

FIG. 16 is a block diagram explaining a first correction result outputting system.

As depicted in FIG. 16, in the first correction result outputting system, the motion sensor output is inputted to the motion signal processing portion 16, the control pixel coordinates and the lens distortion correction coefficient are inputted to the coordinate transformation processing portion 17, and the input image is inputted to the image deforming portion 18. Then, the motion signal processing portion 16 executes the signal processing for converting the motion sensor output into motion information representing the motion of the camera module 11. At this time, the motion signal processing portion 16 executes such signal processing as to correct the integration error or the like as described above. Incidentally, in the description of FIG. 16 to FIG. 20, the motion information representing the motion of the camera module 11 obtained by the coordinate transformation processing portion 17 after such correction is carried out is referred to as a corrected motion sensor output.

In addition, the coordinate transformation processing portion 17 executes such coordinate transformation processing as to correct the camera shake and the lens distortion for the control pixels, and supplies the resulting correction control point coordinates to the image deforming portion 18 based on the corrected motion sensor output supplied thereto from the motion signal processing portion 16. Then, the image deforming portion 18 executes image deformation processing for deforming the input image based on the correction control point coordinates, and outputs the resulting correction result image.

In such a way, in the first correction result outputting system, all the pieces of information necessary for the processing are inputted to the camera module 11, and only the correction result image is outputted from the camera module 11. Therefore, the image stabilization system can be treated as a black box by the first correction result outputting system.

Figure 17:
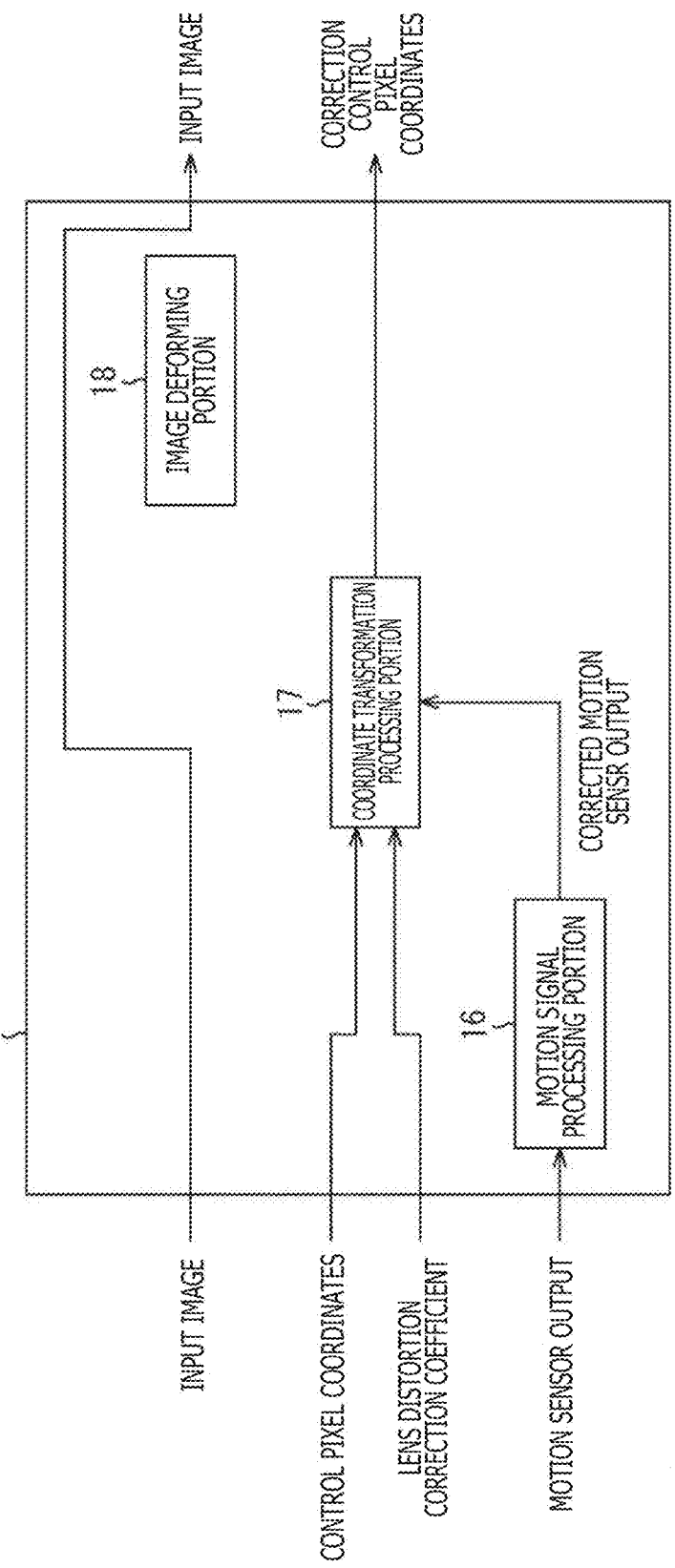
FIG. 17 is a block diagram explaining a second correction result outputting system.

FIG. 17 is a block diagram explaining a second correction result outputting system.

As depicted in FIG. 17, in the second correction result outputting system, the motion sensor output is inputted to the motion signal processing portion 16, and the control pixel coordinates and the lens distortion correction coefficient are inputted to the coordinate transformation processing portion 17. On the other hand, the input image is outputted as it is through the camera module 11. Then, the motion signal processing portion 16 executes the signal processing for the motion sensor output, and supplies the corrected motion sensor output to the coordinate transformation processing portion 17. In addition, the coordinate transformation processing portion 17 executes such coordinate transformation processing as to correct the camera shake and the lens distortion for the control pixels, and outputs the resulting correction control point coordinates based on the corrected motion sensor output supplied thereto from the motion signal processing portion 16.

In such a way, in the second correction result outputting system, all the pieces of information necessary for the processing are inputted to the camera module 11, and the input image for which none of the pieces of processing is executed, and the correction control pixel coordinates are outputted from the camera module 11. Therefore, the correction control pixel coordinates and the input image are inputted to a CG processing system of the system in the subsequent stage, and the image presentation is carried out in a form of the so-called texture mapping to the polygon in accordance with the second correction result outputting system. As a result, the more efficient result image presentation can be realized.

In addition, when the camera module 11 is realized by a hardware circuit for the processing on a line-by-line basis, the correction result in the direction vertical to the line is difficult to reflect on the image owing to a limitation of a capacity of a line memory for holding therein the image information. On the other hand, when the second correction result outputting system is adopted, the problem involved in the line memory is avoided because the processing for the image itself is not executed. In addition, the correction control pixel coordinates and the input image are inputted to the CG processing system, thereby resulting in that the display of the image can also be readily carried out as a result of utilizing the texture mapping.

Figure 18:
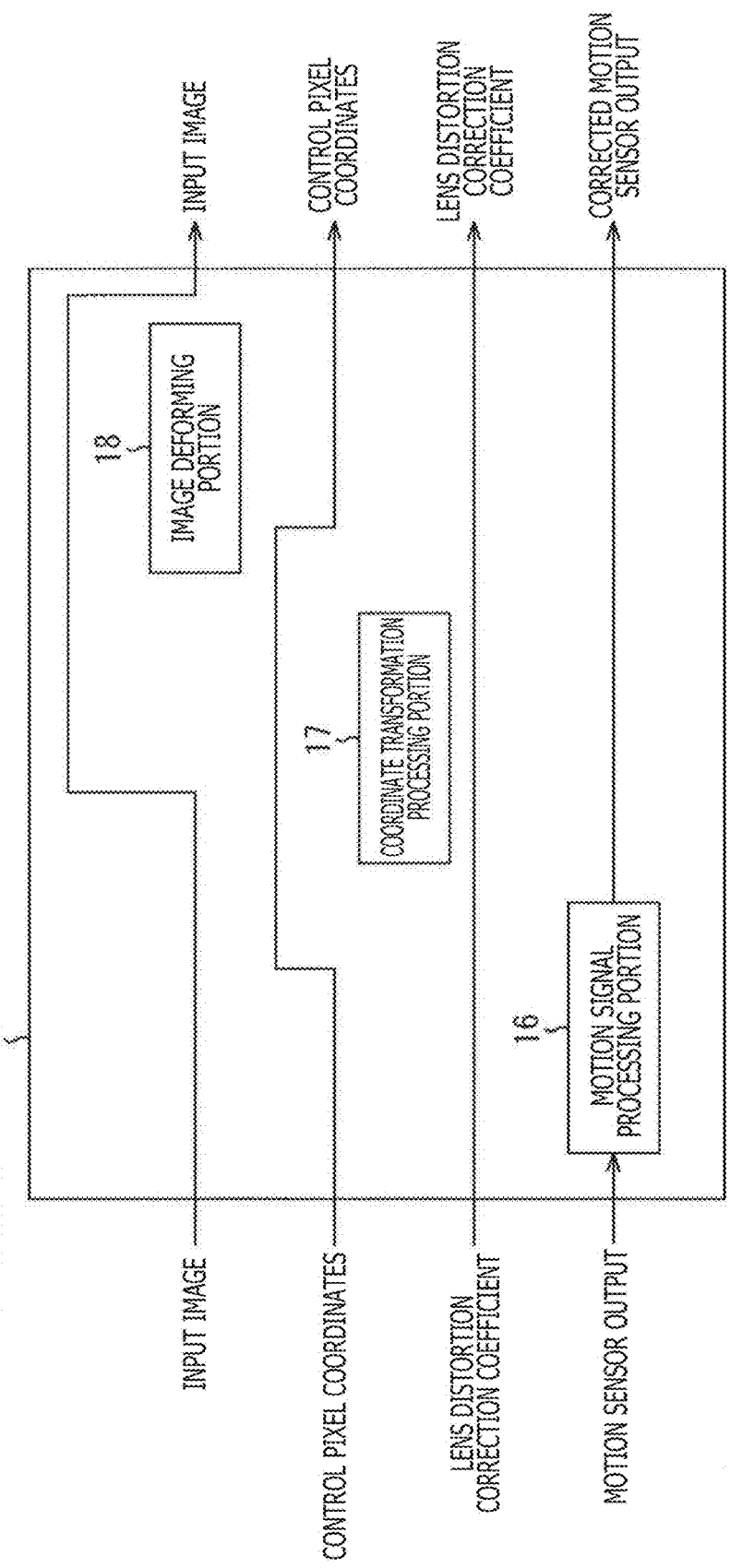
FIG. 18 is a block diagram explaining a third correction result outputting system.

FIG. 18 is a block diagram explaining a third correction result outputting system.

As depicted in FIG. 18, in the third correction result outputting system, the motion sensor output is inputted to the motion signal processing portion 16. On the other hand, the input image, the control pixel coordinates, and the lens distortion correction coefficient are outputted as they are through the camera module 11. Then, the motion signal processing portion 16 executes the signal processing for the motion sensor output, and outputs the corrected motion sensor output.

In such a way, in the third correction result outputting system, only the motion sensor output is an object of the processing in the camera module 11, and other pieces of information are outputted as they are. For example, in the third correction result outputting system, only the motion signal processing in the camera module 11 is utilized and other pieces of information are utilized in the configuration which is uniquely mounted to the subsequent stage of the camera module 11.

In the signal processing by the motion signal processing portion 16, for example, the drift correction for the motion sensor, and the filtering for the noise removal are carried out. However, these pieces of signal processing require know-how for the motion sensor 13. For this reason, it is never easy to master the motion sensor output. In such a case, the signal processing by the motion signal processing portion 16 is provided in the camera module 11, so that other systems connected to the camera module 11 do not need to bear the responsibility for the motion. Thus, it becomes possible to efficiently build the whole system.

Figure 19:
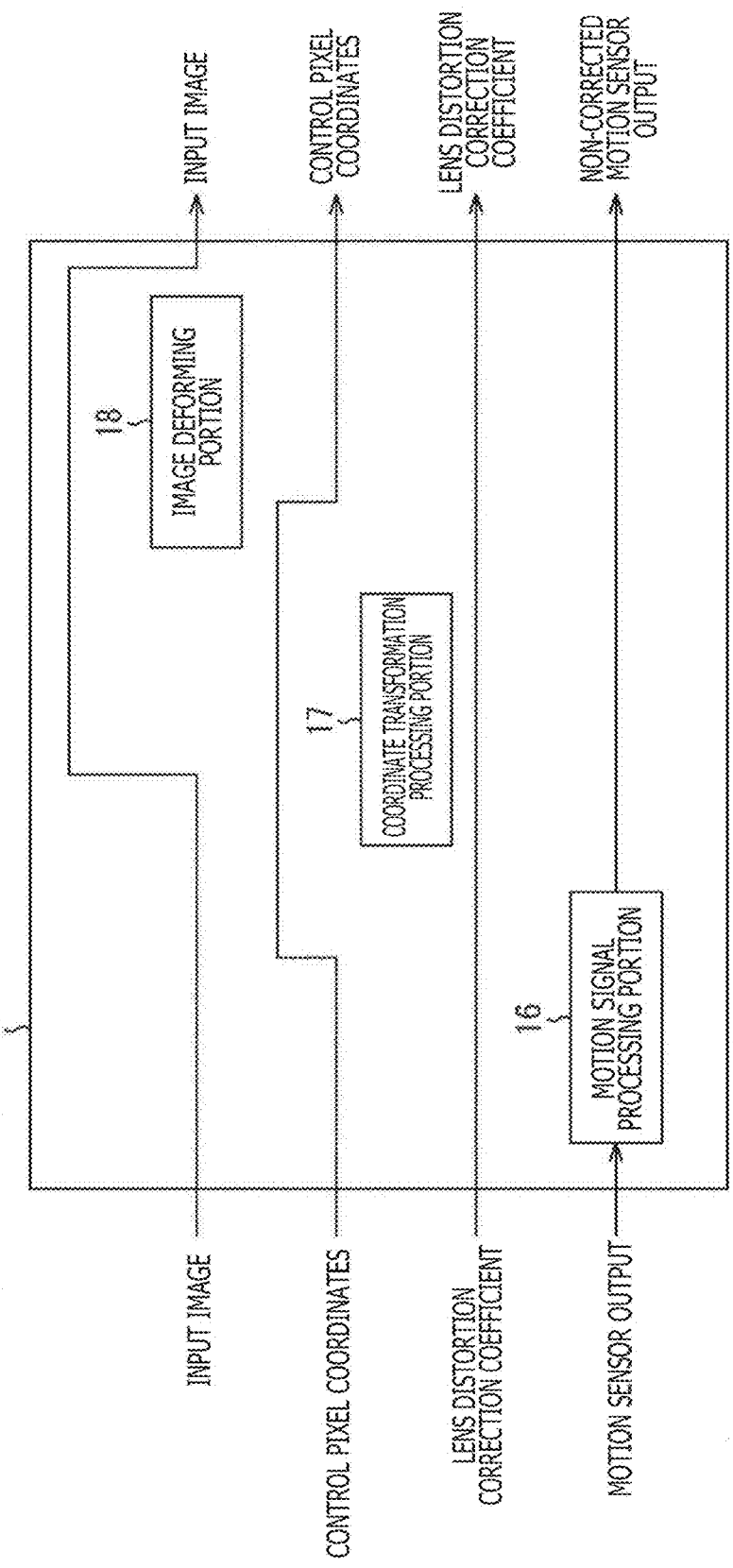
FIG. 19 is a block diagram explaining a fourth correction result outputting system.

FIG. 19 is a block diagram explaining a fourth correction result outputting system.

As depicted in FIG. 19, in the fourth correction result outputting system, the motion sensor output is inputted to the motion signal processing portion 16. On the other hand, the input image, the control pixel coordinates, and the lens distortion correction coefficient are outputted as they are through the camera module 11. Then, the motion signal processing portion 16 executes the signal processing for the motion sensor output to transform the motion sensor output into the motion information representing the motion of the camera module 11. At this time, however, the correction for the integration error or the like as described above is not carried out. That is to say, the motion signal processing portion 16 outputs for which no correction is carried out.

In such a way, in the fourth correction result outputting system, for example, only the angle obtained by simply integrating the angular velocity supplied from the motion sensor 13 is outputted as the motion sensor output for which no correction is carried out, and other pieces of input information are outputted as they are. This is a form which can be adopted when the complicated motion signal processing function, the image deformation processing or the like is mounted in the system in the subsequent stage.

Figure 20:
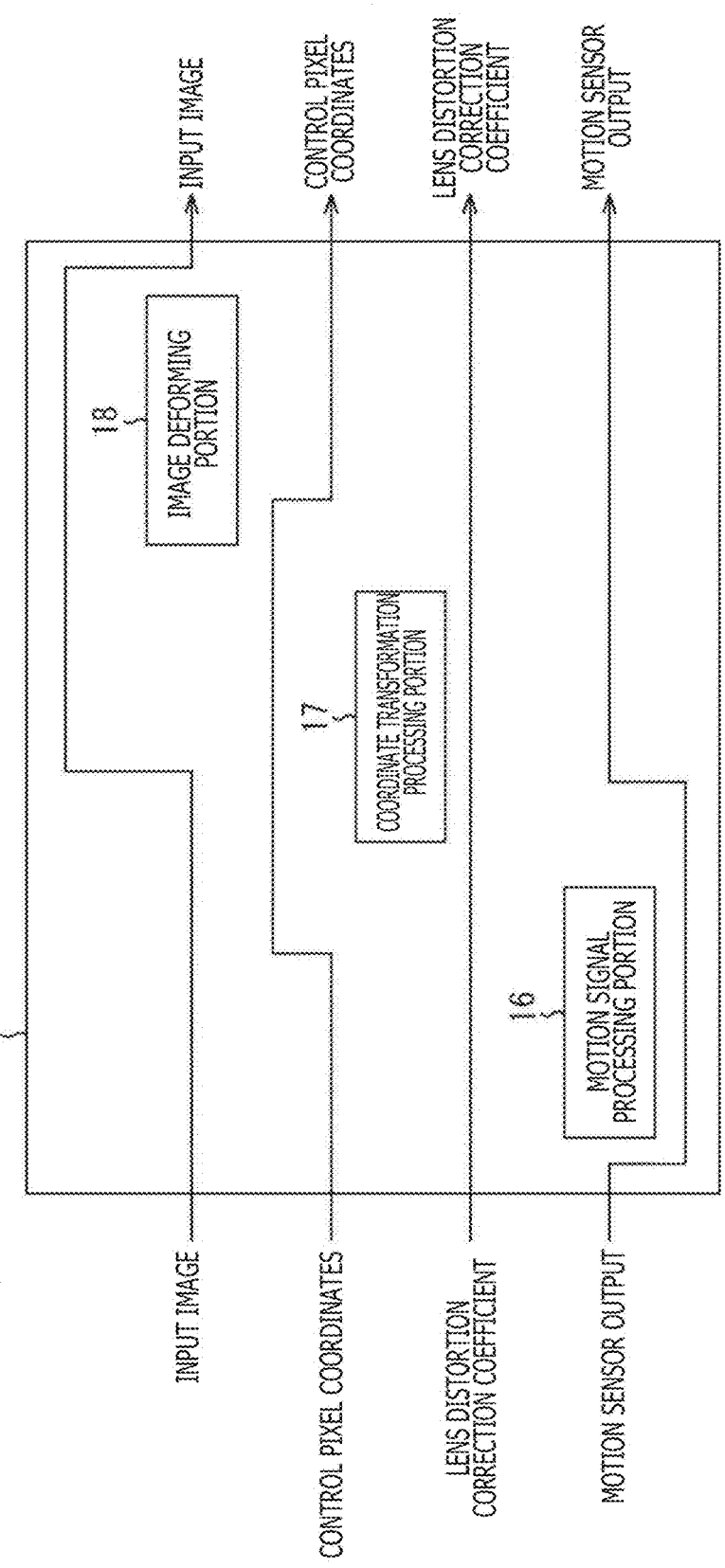
FIG. 20 is a block diagram explaining a fifth correction result outputting system.

FIG. 20 is a block diagram explaining a fifth correction result outputting system.

As depicted in FIG. 20, in the fifth correction result outputting system, the input image, the control pixel coordinates, the lens distortion correction coefficient, and the motion sensor output are outputted as they are through the camera module 11. The processing in the camera module 11 is not executed.

In such a way, in the fifth correction result outputting system, the camera module 11 executes none of the pieces of processing, and passes therethrough the inputted information. This is a form which, for example, supposes the case where the image stabilization function is set OFF at the time of the capturing of the moving image. In the image pickup device to which the camera module 11 is mounted, the switching of the correction result outputting system can be set as may be necessary.

As described above, it is supposed for the camera module 11 to use the first to fifth correction result outputting systems as described above, and the necessary correction results are each outputted to the subsequent stage. For example, the camera module 11 can switch the current correction result outputting system to any of the first to fifth correction result output systems in accordance with the setting by the user.

<With Respect to Horizontal Maintenance Utilizing Acceleration>

A description will now be given with respect to a method of calculating an absolute angle for a horizontal direction by utilizing accelerations in 3-axis directions in the camera module 11 with reference to FIG. 21.

Figure 21:
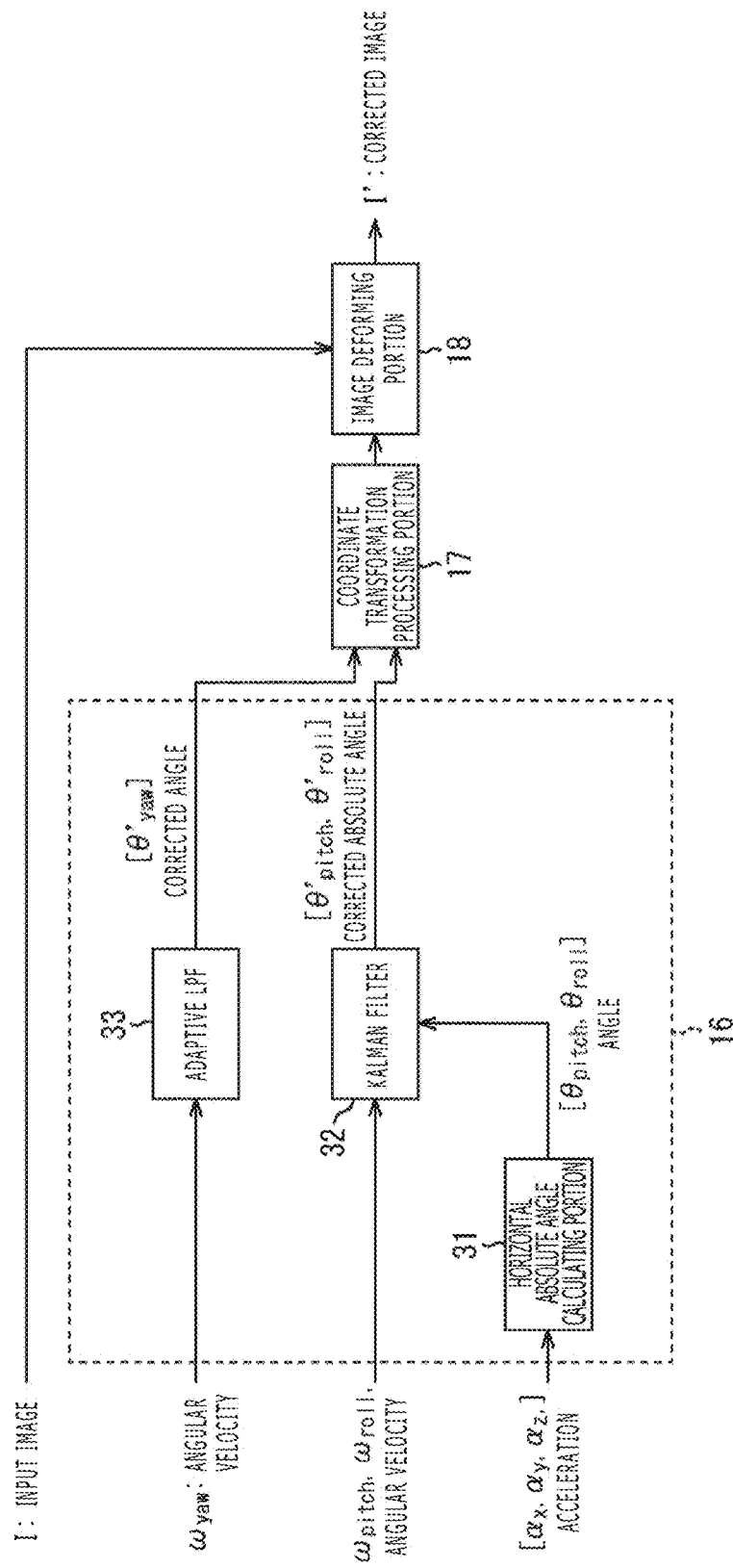
FIG. 21 is a block diagram explaining a method of calculating an absolute angle for a horizontal direction.

As depicted in FIG. 21, the motion signal processing portion 16 is configured to be provided with a horizontal absolute angle calculating portion 31, a Kalman filter 32, and an adaptive low-pass filter (LPF) 33. Then, accelerations in 3-axis directions $[\alpha_x, \alpha_y, \alpha_z]$, an angular velocity in a pitch direction $\omega_{pitch}$, an angular velocity in a roll direction $\omega_{roll}$, and an angular velocity in a yaw direction $\omega_{yaw}$ are supplied as the motion sensor outputs outputted from the motion sensor 13 to the motion signal processing portion 16.

The horizontal absolute angle calculating portion 31 arithmetically operates the following expression (15), thereby calculating tilts, with respect to the vertical direction, of a pitch angle $\theta_{pitch}$ and a roll angle $\theta_{roll}$.

[Math 15]

$$\begin{cases} \theta_{pitch} = \tan^{-1}\left(\frac{-\alpha_x}{\sqrt{\alpha_y^2 + \alpha_z^2}}\right) \\ \theta_{roll} = \tan^{-1}\left(\frac{\alpha_y}{\text{sign}(\alpha_z)\sqrt{\mu\alpha_z^2 + \mu\alpha_x^2}}\right) \end{cases} \quad (15)$$

Figure 22:
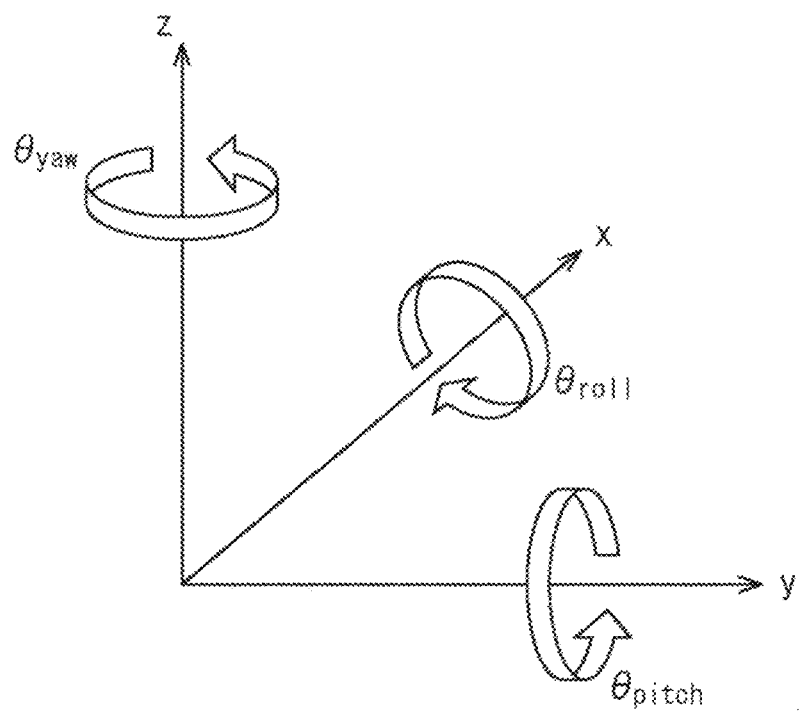
FIG. 22 is a view defining a pitch angle, a roll angle, and yaw angle.

However, in the expression (15), for a parameter $\mu$, an arbitrary value is specified in order to avoid that the division is carried out with zero. In addition, the pitch angle $\theta_{pitch}$, the roll angle $\theta_{roll}$, and the yaw angle $\theta_{yaw}$ are defined in the manner as depicted in FIG. 22.

The Kalman filter 32 carries out the error estimation by the Kalman filter by using the pitch angle $\theta_{pitch}$ and the roll angle $\theta_{roll}$ as the horizontal absolute angles calculated by the horizontal absolute angle calculating portion 31, and an angular velocity in the pitch direction $\omega_{pitch}$ and an angular velocity in the roll direction $\omega_{roll}$.

For example, many momentary errors (errors of high-frequency components) due to the components of the acceleration by the motion of the image sensor 12 are contained in the angle obtained from the acceleration. In addition, many errors (errors of low-frequency components) of the components, which are slowly changed, due to the gyro drift are contained in the angle obtained from the angular velocity. Therefore, the Kalman filter 32 obtains the error estimation in order to remove these errors, and removes away the errors due to the camera shake and the error components due to the gyro drift. As a result, a pitch angle $\theta'_{pitch}$ and a roll angle $\theta'_{roll}$ as the highly accurate horizontal absolute angles can be obtained.

The adaptive LPF 33 calculates an average value when the rotation amount is small. For example, when an acceleration of gravity is only utilized by the Kalman filter 32, the correction for the rotation in the horizontal direction (the rotation in the yaw direction) cannot be carried out. Then, with respect to the angle in the yaw direction, the adaptive LPF 33 applies the adaptive low-pass filter to the angular velocity $\omega_{yaw}$ obtained from the gyro, thereby removing the gyro drift. It should be noted that the adaptive LPF 33 may use any method as long as the average value when the rotation amount is small can be calculated.

For example, the adaptive LPF 33 adaptively calculates a weight $\omega_k$ by a weighted average method using the following expression (16), thereby calculating a weighted average.

[Math 16]

$$\widehat{\omega_k} = \frac{\sum_{t=1}^{N} \omega(t) \exp\left(-\frac{\alpha(t)^2}{2\sigma_a^2}\right) \exp\left(-\frac{d(t)^2}{2\sigma_d^2}\right) \exp\left(-\frac{m(t)^2}{2\sigma_m^2}\right)}{\sum_{t=1}^{N} \exp\left(-\frac{\alpha(t)^2}{2\sigma_a^2}\right) \exp\left(-\frac{d(t)^2}{2\sigma_d^2}\right) \exp\left(-\frac{m(t)^2}{2\sigma_m^2}\right)} \quad (16)$$

an angular acceleration: $\alpha(t) = \omega(t) - \omega(t-1)$ a difference with an offset amount: $d(t) = \omega(t) - \hat{\omega}_{k-1}$ a motion amount obtained from the acceleration:
$m(t) = \sqrt{\alpha_x(t)^2 + \alpha_y(t)^2 + \alpha_z(t)^2}$ That is to say, the adaptive LPF 33, as depicted in the expression (16), calculates an angular acceleration $\alpha(t)$ as a change amount of the angular velocity, calculates a difference $d(t)$ between the currently obtained offset amount and the gyro angular velocity, and calculates a motion amount $m(t)$ obtained from the acceleration. Then, the adaptive LPF 33 can adaptively calculate a weight $\omega_k$ by using the angular acceleration $\alpha(t)$, the difference $d(t)$, and a motion amount $m(t)$.

In such a way, the motion signal processing portion 16 obtains a corrected absolute angle [pitch angle $\theta'_{pitch}$ and roll angle $\theta'_{roll}$], and the corrected angle [yaw angle $\theta'_{yaw}$] from which the gyro drift is removed away, and supplies the resulting corrected absolute angle and corrected angle to the coordinate transformation processing portion 17. Then, the coordinate transformation processing portion 17 can execute the coordinate transformation processing by using the corrected absolute angle and the corrected angle which are obtained by the motion signal processing portion 16. The image deforming portion 18 can carry out the image deformation for the input image I, thereby outputting a corrected image I'.

In such a way, the camera module 11 can carry out the image stabilization with the horizontal maintenance function utilizing an accelerator.

It should be noted that the image deforming portion 18, for example, can execute the image deforming processing disclosed in PTL 1 described above. In addition, the image deforming portion 18, for example, may execute homography processing used in a computer vision.

Figure 23:
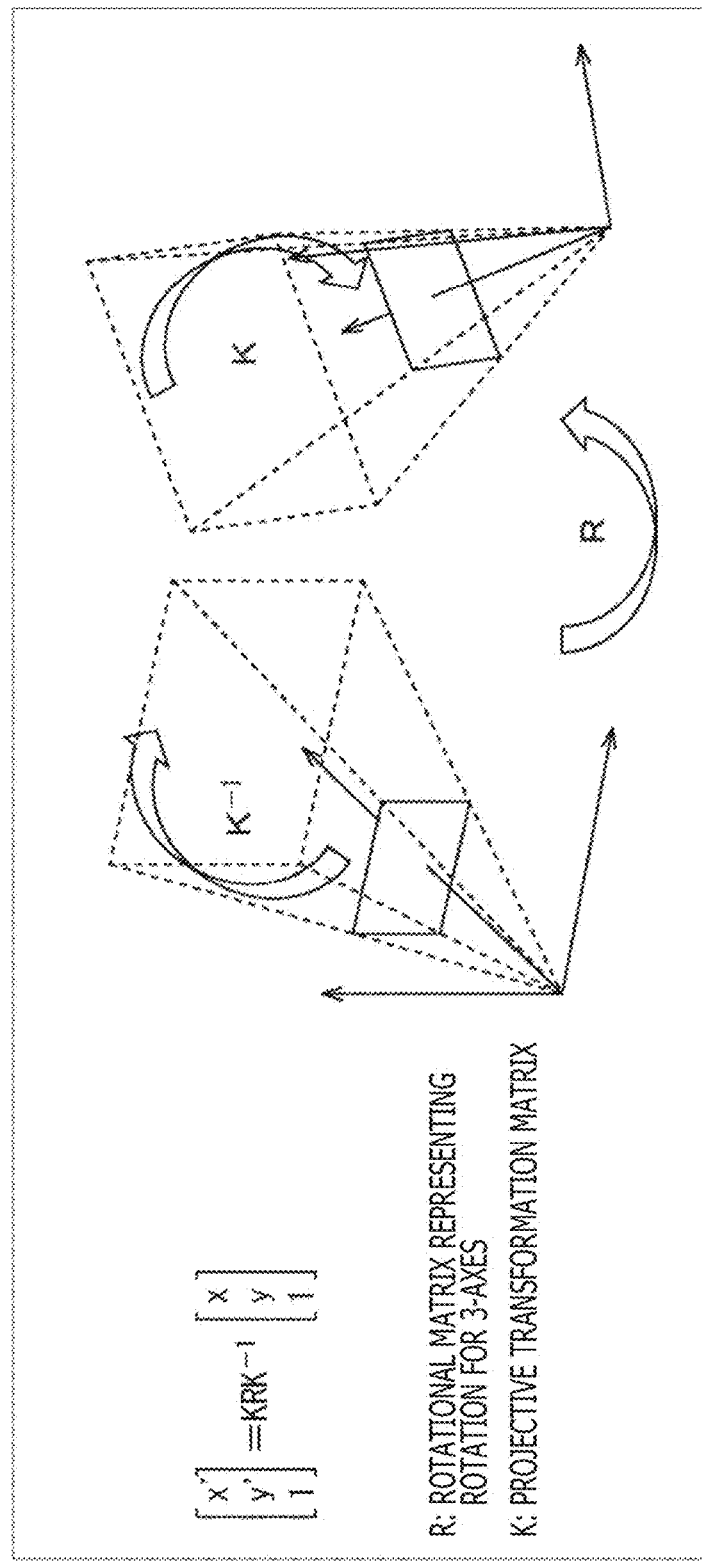
FIG. 23 is a view explaining homography processing.

FIG. 23 is a view explaining the homography processing.

In the homography processing, the image transformation can be carried out by using a rotation matrix R representing the rotation for 3 axes, and a projective transformation matrix K. Here, the rotation matrix R, the projective transformation matrix K, and a projective transformation inverse matrix $K^{-1}$ are expressed by the following expression (17).

[Math 17]

$$R = R_x(\theta_{pitch})R_y(\theta_{yaw})R_z(\theta_{roll}) \quad (17)$$

$$= \begin{bmatrix} 1 & 0 & 0 \\ 0 & \cos(\theta_{pitch}) & \sin(\theta_{pitch}) \\ 0 & -\sin(\theta_{pitch}) & \cos(\theta_{pitch}) \end{bmatrix} \begin{bmatrix} \cos(\theta_{yaw}) & 0 & -\sin(\theta_{yaw}) \\ 0 & 1 & 0 \\ \sin(\theta_{yaw}) & 0 & \cos(\theta_{yaw}) \end{bmatrix}$$

$$\begin{bmatrix} \cos(\theta_{roll}) & \sin(\theta_{roll}) & 0 \\ -\sin(\theta_{roll}) & \cos(\theta_{roll}) & 0 \\ 0 & 0 & 1 \end{bmatrix}$$

$$K = \begin{bmatrix} f_x & 0 & x_c \\ 0 & f_y & y_c \\ 0 & 0 & 1 \end{bmatrix}$$

$$K^{-1} = \begin{bmatrix} 1/f_x & 0 & -x_c/f_x \\ 0 & 1/f_y & -y_c/f_x \\ 0 & 0 & 1 \end{bmatrix}$$

[$f_x$, $f_y$]: total lengths in x and y directions

[$x_c$, $y_c$]: optical centers in x and y directions

In the rotation matrix R represented in this expression (17), the pitch angle $\theta_{pitch}$, the roll angle and the yaw angle $\theta_{yaw}$ are defined in the similar manner to that in FIG. 22 described above. In addition, the projective transformation matrix K, and a projective transformation inverse matrix $K^{-1}$ are expressed by a focal length $f_x$ in the x direction, a focal length $f_y$ in the y direction, an optical center $x_c$ in the x direction, and an optical center $y_c$ in the y direction.

By the series of pieces of processing described above, the electronic image stabilization by which the horizontal direction is usually maintained can be carried out.

<With Respect to Image Pickup Method>

Figure 24:
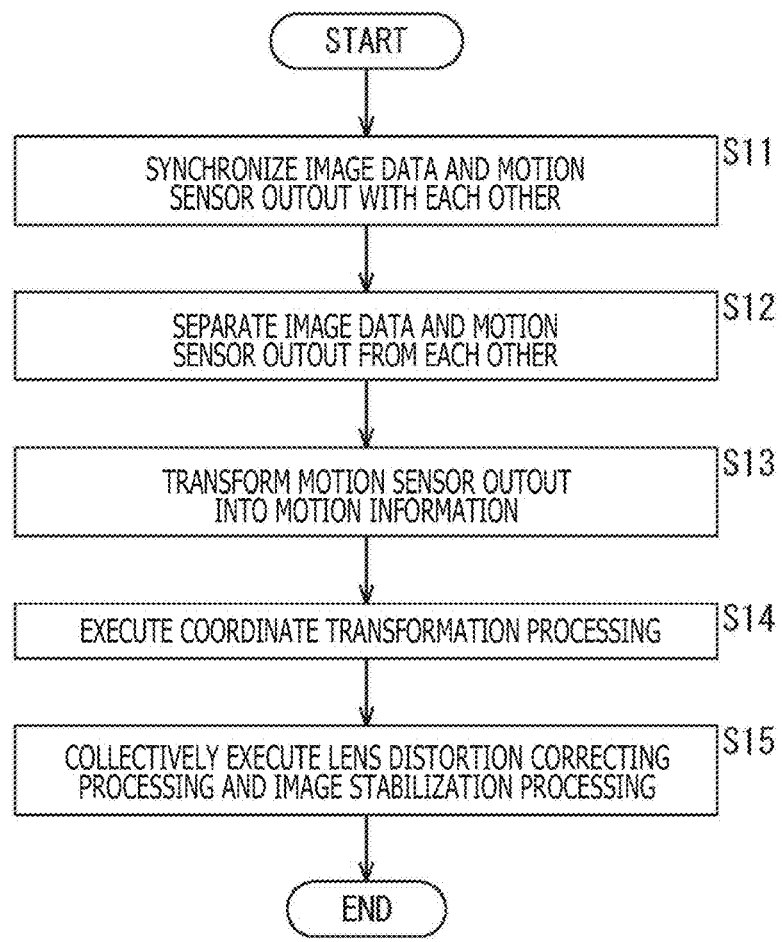
FIG. 24 is a flow chart explaining an image pickup method.

Next, a description will now be given with respect to an example of processing which is executed in an image pickup method by the camera module 11 with reference to a flow chart of FIG. 24.

For example, when the imaging for one frame is started by the image pickup portion 21, in the camera module 11, the processing is started. In Step S11, the synchronization processing portion 22 executes synchronization processing for synchronizing the image data outputted from the image pickup portion 21, and the motion sensor output outputted from the motion sensor 13 with each other. Then, the synchronization processing portion 22 supplies the image data with the motion sensor output which is obtained by integrating the image data and the motion sensor output with each other to the data separating portion 15.

In Step S12, the data separating portion 15 separates the image data with the motion sensor output supplied thereto from the synchronization processing portion 22 in Step S11. Then, the data separating portion 15 supplies the motion sensor output to the motion signal processing portion 16, and supplies the image data to the image deforming portion 18.

In Step S13, the motion signal processing portion 16 transforms the motion sensor output supplied thereto from the data separating portion 15 in Step S12 into the motion information representing the motion of the camera module 11, and supplies the resulting motion information to the coordinate transformation processing portion 17.

In Step S14, the coordinate conversion processing portion 17 reads out the lens distortion coefficient and the control pixel coordinates from the parameter storing portion 14, and executes the coordinate transformation processing based on the motion information supplied thereto from the motion signal processing portion 16 in Step S13. Then, the coordinate transformation processing portion 17 calculates the correction control point coordinates for transforming the coordinates on the image at once so as to suppress the influence which both the camera shake and the distortion exert on the image every control point coordinate in the coordinate transformation processing. Then, the coordinate transformation processing portion 17 supplies the resulting correction control point coordinates to the image deforming portion 18.

In Step S15, the image deforming portion 18 executes the coordinate transformation processing based on the correction control point coordinates supplied thereto from the coordinate transformation processing portion 17 in Step S14 for the image data supplied thereto from the data separating portion 15 in Step S12. In such a way, the image deforming portion 18 executes the coordinate transformation processing for the image data, thereby executing the lens distortion correcting processing and the image stabilization processing at once. As a result, the corrected image is outputted as the correction result image, thereby ending the processing. After that, the processing waits for until the timing at which the imaging for the next one frame is started, and the similar pieces of processing are repetitively executed.

In such a way, in the camera module 11, the lens distortion correcting processing and the image stabilization processing are executed at once, thereby enabling the image to be effectively corrected.

As described above, in the camera module 11, as have been described so far with reference to FIG. 2 to FIG. 5 described above, since the motion information and the image information are synchronized with each other, the image stabilization can be accurately carried out even for the strenuous motion.

Then, in the camera module 11, as described above with reference to FIG. 7 described above, since all the pieces of motion information during the exposure of the image for one frame can be used, including that frame, the camera module 11 can be applied not only to the camera shake, but also to the intra-surface shake correction.

In addition, since the horizontal control as described with reference to FIG. 21 described above is carried out in the camera module 11, for example, the image can be horizontally captured even if the preview is not seen, and the image also can be horizontally captured even when a tripod is unreliably set.

Moreover, in the camera module 11, the reduction of the position alignment accuracy by the electronic image stabilization can be suppressed even in the image peripheral portion by using either a correction method corresponding to the lens distortion model, or a correction method of putting a distortion amount to a table with an image height as a key. Thus, the distortion correction can be realized by executing the simpler processing.

In addition, since in the camera module 11, as described with reference to FIG. 13 to FIG. 15 described above, the processing is executed by using the specific control pixels, the weight saving of the processing can be realized while the reduction of the correction accuracy is prevented.

Then, since in the camera module 11, as described with reference to FIG. 16 to FIG. 20 described above, the various correction result outputting systems are used, the processing results can be outputted in the respective forms, and thus the flexible system configuration can be made.

It should be noted that the camera module 11 can utilize the image sensor 12 and the motion sensor 13, which are configured by the different chips, in combination of them.

Alternatively, there may also be adopted a configuration in which the camera module 11 utilizes a laminated CMOS image sensor in which the sensor substrate and the logic substrate are laminated on each other as the image sensor 12, and the motion sensor 13 is built in the image sensor 12. In such a way, when the image sensor 12 and the motion sensor 13 are configured by the laminated CMOS image sensor, they can be readily synchronized with each other. In addition, there may also be adopted a configuration in which all the blocks constituting the camera module 11 are mounted to the laminated CMOS image sensor.

In addition, for example, in a laminated solid-state image pickup element having a configuration in which memory chips each capable of being utilized as a frame memory for storing therein an image(s) for at least one sheet are laminated on one another, the image deforming portion 18 can execute the image deforming processing for the image(s) stored in the memory chip. That is to say, the present technique can be applied to a laminated CMOS image sensor in which a sensor substrate and a logic substrate are laminated on each other, coordinate transformation processing is executed in the logic substrate, and a correction result image is outputted to a subsequent stage.

Example of Configuration of Electronic Apparatus

Incidentally, the camera module 11 of the embodiment as described above, for example, can be applied to various electronic apparatuses such as an image pickup system such as a digital still camera or a digital video camera, a mobile phone including an image pickup function, or other apparatuses each including an image pickup function.

Figure 25:
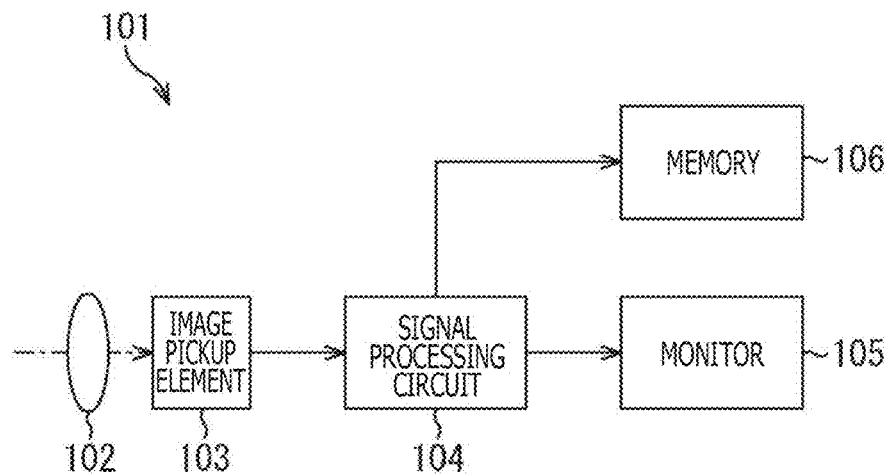
FIG. 25 is a block diagram depicting an example of a configuration of an embodiment of an electronic apparatus to which the present technique is applied.

FIG. 25 is a block diagram depicting an example of a configuration of an image pickup device with which an electronic apparatus is equipped.

As depicted in FIG. 25, an image pickup device 101 is configured to be provided with an optical system 102, an image pickup element 103, a signal processing circuit 104, a monitor 105, and a memory 106, and can capture a still image and a moving image.

The optical system 102 is configured to have one sheet of or a plurality of sheets of lenses, and guides image light (incident light) from a subject to the image pickup element 103 to image the image light on a light receiving surface (sensor portion) of the image pickup element 103.

The camera module 11 of the embodiment described above is applied as the image pickup element 103. The electrons are accumulated in the image pickup element 103 for a given period of time in response to the image formed on the light receiving surface through the optical system 102. Then, a signal corresponding to the electrons accumulated in the image pickup element 103 is supplied to the signal processing circuit 104.

The signal processing circuit 104 executes various pieces of signal processing for the pixel signal outputted thereto from the image pickup element 103. The image (image data) which is obtained by executing the signal processing by the signal processing circuit 104 is supplied to the monitor 105 to be displayed thereon, or supplied to the memory 106 to be stored (recorded) therein.

The camera module 11 of the embodiment described above is applied to the image pickup device 101 configured in such a manner, thereby, for example, enabling the image pickup device 101 to capture the image in which the camera shake and the lens distortion are more accurately corrected.

Examples of Use of Image Sensor

Figure 26:
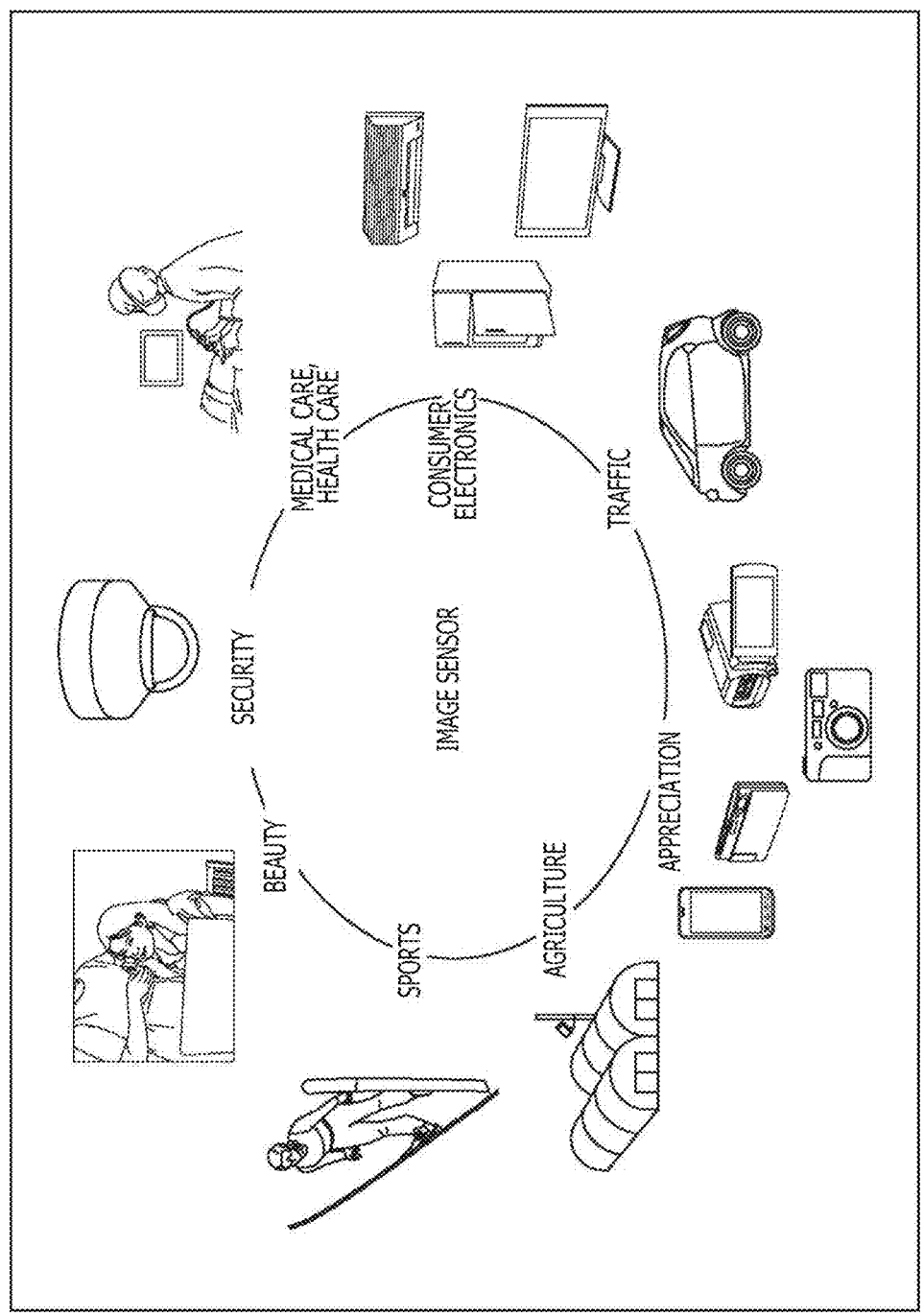
FIG. 26 is a view depicting a use example in which an image sensor is used.

FIG. 26 is a view depicting examples of use of the image sensor described above.

The image sensor described above, for example, as will be described below, can be used in such various cases as to sense the light such as visible light, infrared radiation, ultraviolet rays, and X-rays.

An apparatus, for photographing an image for use in appreciation, such as a digital camera or a portable apparatus with a camera function.

An apparatus, for use in traffic, such as an on-board sensor for photographing, a front side, a rear side, a periphery, a car interior for safe driving such as automatic stop, recognition or the like of a state of a driver, or the like a monitoring camera for monitoring a road for a travelling vehicle, or a distance measuring sensor for measuring a distance between vehicles An apparatus, for use in a consumer electronics, such as a TV, a refrigerator or an air conditioner, for imaging a gesture of a user to carry out an apparatus operation responding to the gesture An apparatus, for use in medical care or health care, such as an endoscope, or an apparatus for photographing a blood vessel by receiving infrared rays An apparatus, for use in security, such as a monitoring camera for security applications, or a camera for person authentication applications An apparatus, for use in beauty, such as a skin measuring instrument for photographing a skin, or a microscope for photographing a scalp An apparatus, for sport, such as an action camera or a wearable camera for sport applications An apparatus, for use in agriculture, such as a camera for monitoring a state of a field or crops Incidentally, the present technique can also adopt the following constitutions.

(1)

A camera module, including:

an image pickup portion configured to receive light, from a subject, made incident thereto through an optical system to image the subject;

a motion detecting portion configured to detect a motion of the image pickup portion while the image for at least one frame is captured in the image pickup portion; and a coordinate transformation processing portion configured to execute coordinate transformation processing for collectively transforming coordinates on the image captured by the image pickup portion in such a way that an influence which both camera shake of the image pickup portion, and a distortion of the optical system exert on the image is suppressed based on the motion of the image pickup portion detected by the motion detecting portion, and a correction coefficient with which the distortion of the optical system is corrected.

(2)

The camera module according to (1) described above, further including:

a synchronization processing portion configured to synchronize the image for one frame captured by the image pickup portion with the motion of the image pickup portion detected by the motion detecting portion on a line-by-line basis.

(3)

The camera module according to (2) described above, in which with one of a timing at which the image for one frame captured by the image pickup portion is outputted every line, and a timing at which the motion of the image pickup portion is detected by the motion detecting portion as a reference, the synchronization processing portion links thereto a timing at which the other is acquired to the one.

(4)

The camera module according to (2) described above, in which the synchronization processing portion carries out the synchronization by utilizing a time stamp for specifying each of timing including a predetermined timing at which the image is captured by the image pickup portion, and a timing at which the motion of the image pickup portion is detected by the motion detecting portion.

(5)

The camera module according to any one of (2) to (4) described above, in which the synchronization processing portion outputs the motion of the image pickup portion detected by the motion detecting portion in a predetermined period of time before or after the image for one frame is captured in the image pickup portion with that motion being contained in one frame.

(6)

The camera module according to any one of (1) to (5) described above, further including:

a motion signal processing portion configured to execute signal processing for an output signal which the motion detecting portion detects the motion of the image pickup portion to output, thereby transforming the output signal into motion information representing the motion of the image pickup portion.

(7)

The camera module according to (6) described above, in which the motion signal processing portion obtains the motion information of the image pickup portion by correcting an error generated during the transformation of the output signal from the motion detecting portion.

(8)

The camera module according to any one of (1) to (7) described above, further including:

an image deformation processing portion configured to deform the image captured by the image pickup portion based on the coordinates transformed by the coordinate transformation portion.

(9)

The camera module according to (8) described above, in which the coordinate transformation portion executes coordinate transformation processing for specific control pixels of all pixels constituting the image, and the image deformation processing portion executes image deformation processing based on the transformed coordinates for the control pixels, and executes interpolation processing for interpolating the pixels other than the control pixels by utilizing a result of the image deformation processing executed for the control pixels.

(10)

The camera module according to (8) or (9) described above, in which the control pixels are arranged either in lattice or in triangular shape with respect to the image.

(11)

The camera module according to any one of (8) to (10) described above, in which the control pixels are arranged non-uniformly in the image.

(12)

The camera module according to any one of (1) to (11) described above, in which the coordinate transformation portion executes coordinate transformation processing for correcting the image in correspondence to a difference in influence of camera shake of the image pickup portion responding to a position within a surface of the image, and a difference in influence of the distortion of the optical system responding to a position within a surface of the image.

(13)

The camera module according to (12) described above, in which the coordinate transformation portion transforms output coordinates outputted by executing the coordinate transformation processing into coordinates when the optical system containing no distortion is used, and after the coordinate transformation portion calculates a correction amount responding to a motion of the image pickup portion detected by the motion detecting portion and a coordinate position within the surface of the image, calculates coordinates in an image when the optical system containing a distortion is used.

(14)

The camera module according to (12) described above, in which the coordinate transforming portion calculates a correction amount responding to the motion of the image pickup portion detected by the motion detecting portion and a coordinate position within the surface of the image with respect to output coordinates outputted by executing the coordinate transformation processing, and calculates coordinates in an image when the optical system containing a distortion is used.

(15)

The camera module according to any one of (12) to (14) described above, in which a correction coefficient complying with a distortion model style of the optical system with the coordinates of the pixels constituting the image as a parameter is measured in advance, and the coordinate transforming portion carries out correction corresponding to the distortion of the optical system an influence of which differs depending on the positions within the surface of the image by utilizing the correction coefficient complying with a distortion model style of the optical system.

(16)

The camera module according to any one of (12) to (14) described above, in which a focal length of the optical system which is changed in response to the position within the surface of the image and a camera shake direction of the image pickup portion is measured in advance, and the coordinate transformation portion corrects the camera shake of the image pickup portion by using the focal length which is changed in response to the positions within the surface of the image and the camera shake direction of the image pickup portion.

(17)

The camera module according to any one of (1) to (16) described above, in which the image captured by the image pickup portion, and the coordinates transformed through the coordinate transformation processing are outputted to a subsequent stage.

(18)

A solid-state image pickup element, including:

an image pickup portion configured to receive light, from a subject, made incident thereto through an optical system to image the subject; and a coordinate transformation processing portion configured to execute coordinate transformation processing for collectively transforming coordinates on the image captured by the image pickup portion in such a way that an influence which both camera shake of the image pickup portion, and a distortion of the optical system exert on the image is suppressed based on a motion of the image pickup portion detected by a motion detecting portion configured to detect a motion of the image pickup portion while the image for at least one frame is captured in the image pickup portion, and a correction coefficient with which the distortion of the optical system is corrected.

(19) An electronic apparatus, including: an image pickup portion configured to receive light, from a subject, made incident thereto through an optical system to image the subject;

a motion detecting portion configured to detect a motion of the image pickup portion while the image for at least one frame is captured in the image pickup portion; and a coordinate transformation processing portion configured to execute coordinate transformation processing for collectively transforming coordinates on the image captured by the image pickup portion in such a way that an influence which both camera shake of the image pickup portion, and a distortion of the optical system exert on the image is suppressed based on the motion of the image pickup portion detected by the motion detecting portion, and a correction coefficient with which the distortion of the optical system is corrected.

(20) An image pickup method, including:

imaging a subject by an image pickup portion configured to receive light, from the subject, made incident thereto through an optical system;

detecting a motion of the image pickup portion while the image for at least one frame is captured in the image pickup portion; and executing coordinate transformation processing for collectively transforming coordinates on the image captured by the image pickup portion in such a way that an influence which both camera shake of the image pickup portion, and a distortion of the optical system exert on the image is suppressed based on the detected motion of the image pickup portion, and a correction coefficient with which the distortion of the optical system is corrected.

It should be noted that the embodiments are by no means limited to the embodiments described above, and various changes can be made without departing from the subject matter of the present disclosure.

REFERENCE SIGNS LIST

11 . . . Camera module, 12 . . . Image sensor, 13 . . . Motion sensor, 14 . . . Parameter storing portion, 15 . . . Data separating portion, 16 . . . Motion signal processing portion, 17 . . . Coordinate transformation processing portion, 18 . . . Image deforming portion, 19 . . . Time stamp issuing unit, 21 . . . Image pickup portion, 22 . . . Synchronization processing portion, 31 . . . Horizontal absolute angle calculating portion, 32 . . . Kalman filter, 33 . . . Adaptive LPF

The invention claimed is:

1. A camera module, comprising:
an image pickup portion configured to receive light, from a subject, made incident thereto through an optical system to image the subject;
a motion detector that detects a motion of the image pickup portion while an image for at least one frame is captured by the image pickup portion;
a coordinate transformation processor that executes coordinate transformation processing for collectively transforming coordinates of the image captured by the image pickup portion in such a way that effects on the image caused by camera shake of the image pickup portion, and by a distortion of the optical system, are suppressed based on the motion of the image pickup portion detected by the motion detector, and based on a correction coefficient with which the distortion of the optical system is corrected; and
a synchronization processor configured to synchronize the image for one frame captured by the image pickup portion with the motion of the image pickup portion detected by the motion detector on a line-by-line basis,
wherein, for one of: a timing at which the image for one frame captured by the image pickup portion is outputted for every line, and a timing at which the motion of the image pickup portion is detected by the motion detector as a reference, the synchronization processor links the one with a timing at which a remaining one, other than the one, is acquired.

2. The camera module according to claim 1, further comprising:
a motion signal processor that executes signal processing for an output signal from the motion detector, the output signal resulting from the motion of the image pickup portion detected by the motion detector, to transform the output signal into motion information representing the motion of the image pickup portion.

3. The camera module according to claim 2, wherein the motion signal processor obtains the motion information of the motion of the image pickup portion by correcting an error generated during the signal processing of the output signal from the motion detector.

4. A camera module, comprising:
an image pickup portion configured to receive light, from a subject, made incident thereto through an optical system to image the subject;
a motion detector configured to detect a motion of the image pickup portion while an image for at least one frame is captured by the image pickup portion;
a coordinate transformation processor configured to execute coordinate transformation processing for collectively transforming coordinates of the image captured by the image pickup portion in such a way that effects on the image, caused by camera shake of the image pickup portion, and by a distortion of the optical system, are suppressed based on the motion of the image pickup portion detected by the motion detector, and based on a correction coefficient with which the distortion of the optical system is corrected; and
an image deformation processor configured to deform the image captured by the image pickup portion based on the coordinates transformed by the coordinate transformation processor,
wherein the coordinate transformation processor executes coordinate transformation processing for specific control pixels of pixels constituting the image, to produce transformed coordinates for the control pixels, and
wherein the image deformation processor executes image deformation processing based on the transformed coordinates for the control pixels, and executes interpolation processing for interpolating remaining ones of the pixels of the image, other than the control pixels, by utilizing a result of the image deformation processing executed for the control pixels.

5. The camera module according to claim 4, wherein the control pixels are arranged either in a lattice or in a triangular shape with respect to the image.

6. The camera module according to claim 4, wherein the control pixels are arranged non-uniformly in the image.

7. A camera module, comprising:
an image pickup portion configured to receive light, from a subject, made incident thereto through an optical system to image the subject;
a motion detector configured to detect a motion of the image pickup portion while an image for at least one frame is captured by the image pickup portion; and
a coordinate transformation processor configured to execute coordinate transformation processing for collectively transforming coordinates of the image captured by the image pickup portion in such a way that effects on the image, caused by camera shake of the image pickup portion, and by a distortion of the optical system, are suppressed based on the motion of the image pickup portion detected by the motion detector, and based on a correction coefficient with which the distortion of the optical system is corrected,
wherein the coordinate transformation processor executes coordinate transformation processing for correcting the image based on a difference in an effect caused by the camera shake of the image pickup portion for a position within a surface of the image, and based on a difference in an effect caused by the distortion of the optical system for a position within a surface of the image.

8. The camera module according to claim 7, wherein the coordinate transformation processor transforms output coordinates, which result from executing the coordinate transformation processing, into coordinates of an image corresponding to when the optical system exhibits no distortion and, after the coordinate transformation processor calculates a correction amount for the motion of the image pickup portion detected by the motion detector and a coordinate position within the surface of the image, calculates coordinates of an image corresponding to when the optical system exhibits a distortion.

9. The camera module according to claim 7, wherein the coordinate transforming processor calculates a correction amount for the motion of the image pickup portion detected by the motion detector and a coordinate position within the surface of the image with respect to output coordinates, which result from executing the coordinate transformation processing, and calculates coordinates of an image corresponding to when the optical system exhibits a distortion.

10. The camera module according to claim 7,
wherein a correction coefficient complying with a distortion model style of the optical system, for which coordinates of pixels constituting the image are used as a parameter, is measured in advance, and
wherein the coordinate transforming portion carries out a correction process corresponding to the distortion of the optical system, in which an effect on the image differs depending on position within the surface of the image, by utilizing the correction coefficient complying with the distortion model style of the optical system.

11. The camera module according to claim 7,
wherein a focal length of the optical system, which changes in response to the position within the surface of the image and a camera shake direction of the image pickup portion, is measured in advance, and
wherein the coordinate transformation processor corrects the camera shake of the image pickup portion by using the focal length, which changes in response to the position within the surface of the image and the camera shake direction of the image pickup portion.

12. The camera module according to claim 7, wherein the image captured by the image pickup portion, and the coordinates transformed through the coordinate transformation processing, are outputted to a subsequent stage.

* * * * *